United States Patent
Suzuki et al.

(10) Patent No.: US 10,538,144 B2
(45) Date of Patent: Jan. 21, 2020

(54) VEHICLE AIR CONDITIONING DEVICE

(71) Applicant: SANDEN HOLDINGS CORPORATION, Isesaki-shi, Gunma (JP)

(72) Inventors: Kenichi Suzuki, Isesaki (JP); Ryo Miyakoshi, Isesaki (JP); Kouhei Yamashita, Isesaki (JP)

(73) Assignee: SANDEN HOLDINGS CORPORATION, Isesaki-shi, Gunma (JP)

( * ) Notice: Subject to any disclaimer, the term of this patent is extended or adjusted under 35 U.S.C. 154(b) by 0 days.

(21) Appl. No.: 16/378,077

(22) Filed: Apr. 8, 2019

(65) Prior Publication Data

US 2019/0255911 A1     Aug. 22, 2019

Related U.S. Application Data

(62) Division of application No. 15/309,374, filed as application No. PCT/JP2015/057722 on Mar. 16, 2015, now Pat. No. 10,427,495.

(30) Foreign Application Priority Data

May 8, 2014 (JP) ................................. 2014-096686

(51) Int. Cl.
*B60H 1/00* (2006.01)
*B60H 1/22* (2006.01)
(Continued)

(52) U.S. Cl.
CPC ......... *B60H 1/00921* (2013.01); *B60H 1/008* (2013.01); *B60H 1/0075* (2013.01);
(Continued)

(58) Field of Classification Search
CPC .............. B60H 1/00921; B60H 1/0075; B60H 1/00764; B60H 1/00785; B60H 1/008;
(Continued)

(56) References Cited

U.S. PATENT DOCUMENTS 2,666,298 A * 1/1954 Jones .................... F25B 47/022
                                                            62/156
5,355,689 A * 10/1994 Hara ................... B60H 1/00814
                                                            62/159
(Continued)

FOREIGN PATENT DOCUMENTS

DE      102010025779 A1    1/2011
EP         0678409 A1     10/1995
(Continued)

OTHER PUBLICATIONS

The State Intellectual Property Office of the People's Republic of China, The First Office Action issued in Chinese Application No. 201580023876.0, dated Jul. 2, 2018.
(Continued)

*Primary Examiner* — Claire E Rojohn, III
(74) *Attorney, Agent, or Firm* — Baker Botts L.L.P.

(57) ABSTRACT

There is disclosed a vehicle air conditioning device of a heat pump system which delays proceeding of frosting onto an outdoor heat exchanger, thereby eliminating or inhibiting deterioration of a heating capability due to the frosting. The vehicle air conditioning device executes a heating mode in which a controller lets a refrigerant discharged from a compressor 2 radiate heat in a radiator 4, decompresses the refrigerant by which heat has been radiated, and then lets the refrigerant absorb heat in an outdoor heat exchanger 7, and on the basis of a difference ΔTXO=(TXObase−TXO) between a refrigerant evaporation temperature TXObase of the outdoor heat exchanger 7 in non-frosting and a refrigerant evaporation temperature TXO of the outdoor heat
(Continued)

exchanger 7, the controller corrects a target subcool degree TGSC that is a target value of a subcool degree of the refrigerant in the radiator 4 in an increasing direction in accordance with increase of the difference $\Delta$TXO.

1 Claim, 26 Drawing Sheets

(51) Int. Cl.
 B60H 1/32 (2006.01)
 F25B 5/04 (2006.01)
 F25B 6/04 (2006.01)
 F25B 40/00 (2006.01)
(52) U.S. Cl.
 CPC ..... B60H 1/00385 (2013.01); B60H 1/00764 (2013.01); B60H 1/00785 (2013.01); B60H 1/00807 (2013.01); B60H 1/00864 (2013.01); B60H 1/2221 (2013.01); B60H 1/2225 (2013.01); B60H 1/321 (2013.01); F25B 5/04 (2013.01); F25B 6/04 (2013.01); F25B 40/00 (2013.01); B60H 2001/00957 (2013.01); B60H 2001/00961 (2019.05); B60H 2001/3251 (2013.01); B60H 2001/3258 (2013.01); B60H 2001/3283 (2013.01); B60H 2001/3285 (2013.01); F25B 2400/0411 (2013.01); F25B 2700/195 (2013.01); F25B 2700/2104 (2013.01); F25B 2700/2106 (2013.01); F25B 2700/2116 (2013.01)
(58) Field of Classification Search
 CPC ........... B60H 1/00807; B60H 1/00864; B60H 1/2221; B60H 1/321; F25B 5/04; F25B 6/04; F25B 40/00
 USPC .......................................................... 62/186
 See application file for complete search history.

(56) References Cited

U.S. PATENT DOCUMENTS

| | | | | |
|---|---|---|---|---|
| 5,388,421 | A * | 2/1995 | Matsuoka | B60H 1/00007 62/209 |
| 5,419,149 | A * | 5/1995 | Hara | B60H 1/00007 62/160 |
| 5,704,217 | A | 1/1998 | Itoh et al. | |
| 5,983,652 | A * | 11/1999 | Iritani | B60H 1/00021 62/156 |
| 6,047,770 | A * | 4/2000 | Suzuki | B60H 1/00007 165/202 |
| 6,422,308 | B1 * | 7/2002 | Okawara | B60H 1/00921 165/202 |
| 6,920,922 | B2 * | 7/2005 | Takeuchi | B60H 1/00921 165/202 |
| 8,893,524 | B1 * | 11/2014 | Archer | F25D 3/14 62/457.2 |
| 8,910,489 | B2 * | 12/2014 | Choi | B60H 1/00921 236/34.5 |
| 9,188,350 | B2 * | 11/2015 | Choi | B60H 1/00 |
| 9,506,683 | B2 * | 11/2016 | Katoh | B60H 1/00342 |
| 9,517,677 | B2 * | 12/2016 | Tokuda | B60H 1/00278 |
| 9,581,370 | B2 * | 2/2017 | Inaba | B60H 1/00899 |
| 9,696,067 | B2 * | 7/2017 | Rite | F25B 30/02 |
| 9,797,641 | B2 * | 10/2017 | Suzuki | B60H 1/00785 |
| 9,810,465 | B2 * | 11/2017 | Kang | F25B 5/00 |
| 9,895,956 | B2 * | 2/2018 | Satou | B60H 1/3204 |
| 9,909,794 | B2 * | 3/2018 | Suzuki | F25B 47/022 |
| 10,101,064 | B2 * | 10/2018 | Ariga | F24F 1/0003 |
| 10,160,290 | B2 * | 12/2018 | Durrani | B60H 1/00921 |
| 10,166,838 | B2 * | 1/2019 | Inaba | B60H 1/3207 |
| 10,207,566 | B2 * | 2/2019 | Shin | B60H 1/00057 |
| 2004/0055305 | A1 * | 3/2004 | Kuroda | B60H 1/00735 60/698 |
| 2004/0079096 | A1 * | 4/2004 | Itoh | B60H 1/00735 62/223 |
| 2006/0016214 | A1 * | 1/2006 | Gorbounov | F25B 13/00 62/513 |
| 2008/0196877 | A1 * | 8/2008 | Zeigler | B60H 1/00907 165/202 |
| 2008/0276636 | A1 * | 11/2008 | Thybo | F25B 49/022 62/228.3 |
| 2009/0241569 | A1 * | 10/2009 | Okada | F25B 40/00 62/196.1 |
| 2011/0016896 | A1 * | 1/2011 | Oomura | B60H 1/00785 62/155 |
| 2011/0167850 | A1 * | 7/2011 | Itoh | B60H 1/00914 62/160 |
| 2012/0255319 | A1 * | 10/2012 | Itoh | F24F 3/1405 62/160 |
| 2013/0312447 | A1 * | 11/2013 | Inaba | F25B 43/00 62/324.6 |
| 2014/0338382 | A1 | 11/2014 | Miyakoshi et al. | |
| 2014/0352341 | A1 * | 12/2014 | Hamamoto | B60H 1/22 62/243 |
| 2015/0314668 | A1 * | 11/2015 | Suzuki | F25B 1/10 62/160 |
| 2016/0193896 | A1 * | 7/2016 | Miyakoshi | B60H 1/00385 62/155 |
| 2016/0201960 | A1 * | 7/2016 | Miyakoshi | B60H 1/00385 62/154 |
| 2016/0201961 | A1 * | 7/2016 | Miyakoshi | B60H 1/00921 62/133 |
| 2018/0141411 | A1 * | 5/2018 | Miyakoshi | B60H 1/20 |
| 2018/0156509 | A1 * | 6/2018 | Tada | F25B 41/04 |
| 2018/0178629 | A1 * | 6/2018 | Suzuki | B60H 1/00385 |
| 2018/0194191 | A1 * | 7/2018 | Suzuki | B60H 1/22 |
| 2018/0201088 | A1 * | 7/2018 | Nomura | F25B 47/02 |
| 2018/0297446 | A1 * | 10/2018 | Miyakoshi | B60H 1/00921 |
| 2018/0354342 | A1 * | 12/2018 | Miyakoshi | B60H 1/00921 |
| 2018/0354343 | A1 * | 12/2018 | Suzuki | B60H 1/00921 |
| 2018/0361828 | A1 * | 12/2018 | Kato | F25B 5/04 |
| 2018/0370329 | A1 * | 12/2018 | Ishizeki | B60H 1/00914 |
| 2019/0023100 | A1 * | 1/2019 | Suzuki | F25B 5/02 |
| 2019/0030989 | A1 * | 1/2019 | Miura | F25B 29/00 |
| 2019/0047362 | A1 * | 2/2019 | Suzuki | B60H 1/00921 |

FOREIGN PATENT DOCUMENTS

| | | |
|---|---|---|
| JP | 09-142139 A | 6/1997 |
| JP | 2001-138735 A | 5/2001 |
| JP | 2011-324237 A | 11/2001 |
| JP | 3985384 B2 | 10/2007 |
| JP | 2011-011686 A | 1/2011 |
| WO | 2013/084738 A1 | 6/2013 |

OTHER PUBLICATIONS

Japan Patent Office, Notification of Reasons for Refusal issued in Japanese Patent Application No. 2014-096686, dated Apr. 10, 2018.

* cited by examiner

VEHICLE AIR CONDITIONING DEVICE

CROSS-REFERENCE TO RELATED APPLICATIONS

This application is Divisional of U.S. patent application Ser. No. 15/309,374, filed on Nov. 7, 2016, which is a U.S. National Stage Patent Application under 37 U.S.C. § 371 of International Patent Application No. PCT/JP2015/057722, filed on Mar. 16, 2015, which claims the benefit of Japanese Patent Application No. JP 2014-096686, filed on May 8, 2014, the disclosures of each of which are incorporated herein by reference in their entirety.

TECHNICAL FIELD

The present invention relates to a vehicle air conditioning device of a heat pump system which conditions air in a vehicle interior, and more particularly, it relates to a vehicle air conditioning device which is applicable to a hybrid car or an electric car.

BACKGROUND ART

Due to actualization of environmental problems in recent years, hybrid cars and electric cars have spread. Further, as an air conditioning device which is applicable to such a vehicle, there has been developed an air conditioning device which includes a compressor to compress and discharge a refrigerant, a radiator (a condenser) disposed in a vehicle interior to let the refrigerant radiate heat, a heat absorber (an evaporator) disposed in the vehicle interior to let the refrigerant absorb heat, and an outdoor heat exchanger disposed outside the vehicle interior to let the refrigerant radiate or absorb heat, and which changes and executes respective modes of a heating mode to let the refrigerant discharged from the compressor radiate heat in the radiator and let the refrigerant by which heat has been radiated in this radiator absorb heat in the outdoor heat exchanger, a dehumidifying mode to let the refrigerant discharged from the compressor radiate heat in the radiator and let the refrigerant by which heat has been radiated in the radiator absorb heat in the heat absorber, and a cooling mode to let the refrigerant discharged from the compressor radiate heat in the outdoor heat exchanger and let the refrigerant absorb heat in the heat absorber (e.g., see Patent Document 1).

CITATION LIST

Patent Documents

Patent Document 1: Publication of Japanese Patent No. 3985384

SUMMARY OF THE INVENTION

Problems to be solved by the Invention

Here, in the above heating mode, an outdoor heat exchanger functions as an evaporator of a refrigerant. Therefore, when a vehicle air conditioning device is started to execute the heating mode, water in outdoor air forms frost to adhere to the outdoor heat exchanger, thereby growing, depending on conditions of temperature/humidity of the outdoor air. In a case where the frost is formed on the outdoor heat exchanger in the heating mode, the frost becomes a thermal resistance to deteriorate heat transfer properties and to decrease flow of air into the heat exchanger, and hence a heat exchange performance with the outdoor air remarkably deteriorates and heat cannot be absorbed from the outdoor air, thereby causing the problem that a required heating capability cannot be obtained.

FIG. 26 shows such a relation between a refrigerant evaporation temperature TXO of the outdoor heat exchanger and the heating capability. When the frosting of the outdoor heat exchanger proceeds, the refrigerant evaporation temperature TXO lowers due to deterioration of a heat absorbing performance, and hence the heating capability also deteriorates. This also applies to a relation between a suction refrigerant temperature Ts of a compressor and the heating capability. On the other hand, as shown in the drawing, it can be seen that, for example, when a compressor number of revolution decreases from 8000 rpm to 5000 rpm on certain conditions, a heat absorbing capability of the outdoor heat exchanger can decrease, and hence it is possible to raise the refrigerant evaporation temperature TXO.

The present invention has been developed to solve such a conventional technical problem, and an object thereof is to delay proceeding of frosting onto an outdoor heat exchanger, thereby eliminating or inhibiting deterioration of a heating capability due to the frosting in a vehicle air conditioning device of a so-called heat pump system.

Means for solving the Problems

To solve the above problem, a vehicle air conditioning device of the invention of claim 1 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and the vehicle air conditioning device is characterized in that on the basis of a difference $\Delta TXO=(TXObase-TXO)$ between a refrigerant evaporation temperature TXObase of the outdoor heat exchanger in non-frosting and a refrigerant evaporation temperature TXO of the outdoor heat exchanger, the control means corrects a target subcool degree TGSC that is a target value of a subcool degree of the refrigerant in the radiator in an increasing direction in accordance with increase of the difference $\Delta TXO$.

A vehicle air conditioning device of the invention of claim 2 includes a compressor which compresses a refrigerant, an air flow passage through which air to be supplied to a vehicle interior flows, an indoor blower to supply the air to this air flow passage, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and the vehicle air conditioning device is characterized in that on the basis of a difference ΔTXO=(TXObase−TXO) between a refrigerant evaporation temperature TXObase of the outdoor heat exchanger in non-frosting and a refrigerant evaporation temperature TXO of the outdoor heat exchanger, the control means corrects an air volume of the indoor blower in a decreasing direction in accordance with increase of the difference ΔTXO.

A vehicle air conditioning device of the invention of claim 3 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and the vehicle air conditioning device is characterized in that on the basis of a difference ΔTXO=(TXObase−TXO) between a refrigerant evaporation temperature TXObase of the outdoor heat exchanger in non-frosting and a refrigerant evaporation temperature TXO of the outdoor heat exchanger, the control means corrects an upper limit of controlling of a compressor number of revolution in a decreasing direction in accordance with increase of the difference ΔTXO.

A vehicle air conditioning device of the invention of claim 4 includes a compressor which compresses a refrigerant, an air flow passage through which air to be supplied to a vehicle interior flows, a suction changing damper to control an indoor/outdoor air ratio of the air to be introduced into this air flow passage, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and the vehicle air conditioning device is characterized in that on the basis of a difference ΔTXO=(TXObase−TXO) between a refrigerant evaporation temperature TXObase of the outdoor heat exchanger in non-frosting and a refrigerant evaporation temperature TXO of the outdoor heat exchanger, the control means corrects an indoor air ratio of the air to be introduced into the air flow passage by the suction changing damper in an increasing direction in accordance with increase of the difference ΔTXO.

A vehicle air conditioning device of the invention of claim 5 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor blower to blow outdoor air through this outdoor heat exchanger, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and the vehicle air conditioning device is characterized in that on the basis of a difference ΔTXO=(TXObase−TXO) between a refrigerant evaporation temperature TXObase of the outdoor heat exchanger in non-frosting and a refrigerant evaporation temperature TXO of the outdoor heat exchanger, the control means corrects an air volume of the outdoor blower in an increasing direction in accordance with increase of the difference ΔTXO.

A vehicle air conditioning device of the invention of claim 6 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and the vehicle air conditioning device is characterized in that the control means corrects a target subcool degree TGSC that is a target value of a subcool degree of the refrigerant in the radiator in an increasing direction at an early stage of start.

A vehicle air conditioning device of the invention of claim 7 includes a compressor which compresses a refrigerant, an air flow passage through which air to be supplied to a vehicle interior flows, an indoor blower to supply the air to this air flow passage, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and the vehicle air conditioning device is characterized in that the control means does not increase an air volume of the indoor blower and/or decreases an upper limit of controlling of a compressor number of revolution, until a high pressure side pressure increases to a predetermined value.

A vehicle air conditioning device of the invention of claim 8 includes a compressor which compresses a refrigerant, an air flow passage through which air to be supplied to a vehicle interior flows, an indoor blower to supply the air to this air flow passage, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and the vehicle air conditioning device is characterized in that the control means decreases an air volume of the indoor blower in a case where a suction refrigerant temperature Ts of the compressor lowers to a predetermined value or in a case where a refrigerant evaporation temperature TXO of the outdoor heat exchanger lowers to a predetermined value.

A vehicle air conditioning device of the invention of claim 9 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and the vehicle air conditioning device is characterized in that the control means adjusts a compressor number of revolution to maintain a suction refrigerant temperature Ts of the compressor or a refrigerant evaporation temperature TXO of the outdoor heat exchanger at a predetermined value.

A vehicle air conditioning device of the invention of claim 10 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and the vehicle air conditioning device is characterized in that the control means decreases an upper limit of controlling of a compressor number of revolution in a case where a suction refrigerant temperature Ts of the compressor or a refrigerant evaporation temperature TXO of the outdoor heat exchanger lowers to a predetermined value.

A vehicle air conditioning device of the invention of claim 11 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor blower to blow outdoor air through this outdoor heat exchanger, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and the vehicle air conditioning device is characterized in that the control means increases an air volume of the outdoor blower in a case where a suction refrigerant temperature Ts of the compressor or a refrigerant evaporation temperature TXO of the outdoor heat exchanger lowers to a predetermined value.

A vehicle air conditioning device of the invention of claim 12 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, auxiliary heating means for heating the air to be supplied from the air flow passage to the vehicle interior, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and the vehicle air conditioning device is characterized in that the control means operates the auxiliary heating means in a case where an outdoor air temperature is low at an early stage of start.

Advantageous Effect of the Invention

According to the invention of claim 1, a vehicle air conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and in the vehicle air conditioning device, on the basis of a difference $\Delta TXO=(TXObase-TXO)$ between a refrigerant evaporation temperature TXObase of the outdoor heat exchanger in non-frosting and a refrigerant evaporation temperature TXO of the outdoor heat exchanger, the control means corrects a target subcool degree TGSC that is a target value of a subcool degree of the refrigerant in the radiator in an increasing direction in accordance with increase of the difference $\Delta TXO$.

When frosting starts onto the outdoor heat exchanger in the heating mode, the refrigerant evaporation temperature TXO of the outdoor heat exchanger lowers, and the difference $\Delta TXO=(TXObase-TXO)$ from the refrigerant evaporation temperature TXObase of the outdoor heat exchanger in the non-frosting increases, so that the control means corrects the target subcool degree TGSC of the radiator in the increasing direction. When the target subcool degree TGSC of the radiator increases, a radiator pressure (a high pressure side pressure) increases, a compressor number of revolution therefore decreases, an outdoor heat exchanger pressure (a low pressure side pressure) also increases, and the frosting is hard to occur onto the outdoor heat exchanger. Consequently, the vehicle air conditioning device delays proceeding of the frosting onto the outdoor heat exchanger, thereby making it possible to eliminate or inhibit deterioration of a heating capability due to the frosting.

According to the invention of claim 2, a vehicle air conditioning device includes a compressor which compresses a refrigerant, an air flow passage through which air to be supplied to a vehicle interior flows, an indoor blower to supply the air to this air flow passage, a radiator which lets the refrigerant radiate heat to heat the air to be supplied from this air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and the vehicle air conditioning device is characterized in that on the basis of a difference $\Delta TXO=(TXObase-TXO)$ between a refrigerant evaporation temperature TXObase of the outdoor heat exchanger in non-frosting and a refrigerant evaporation temperature TXO of the outdoor heat exchanger, the control means corrects an air volume of the indoor blower in a decreasing direction in accordance with increase of the difference $\Delta TXO$.

When the air volume of the indoor blower decreases, a required heating capability decreases, a compressor number of revolution therefore also decreases, and a quantity of heat to be absorbed in the outdoor heat exchanger also decreases. Consequently, similarly in a situation where frosting occurs onto the outdoor heat exchanger, the vehicle air conditioning device delays proceeding of the frosting onto the outdoor heat exchanger, thereby making it possible to eliminate or inhibit deterioration of the heating capability due to the frosting.

According to the invention of claim 3, a vehicle air conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and in the vehicle air conditioning device, on the basis of a difference $\Delta TXO=(TXObase-TXO)$ between a refrigerant evaporation temperature TXObase of the outdoor heat exchanger in non-frosting and a refrigerant evaporation temperature TXO of the outdoor heat exchanger, the control means corrects an upper limit of controlling of a compressor number of revolution in a decreasing direction in accordance with increase of the difference $\Delta TXO$.

When the upper limit of controlling of the compressor number of revolution decreases, a quantity of heat to be absorbed in the outdoor heat exchanger also decreases, so that similarly in a situation where frosting occurs onto the outdoor heat exchanger, the vehicle air conditioning device delays proceeding of the frosting onto the outdoor heat exchanger, thereby making it possible to eliminate or inhibit deterioration of a heating capability due to the frosting.

According to the invention of claim 4, a vehicle air conditioning device includes a compressor which compresses a refrigerant, an air flow passage through which air to be supplied to a vehicle interior flows, a suction changing damper to control an indoor/outdoor air ratio of the air to be introduced into this air flow passage, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and in the vehicle air conditioning device, on the basis of a difference $\Delta TXO=(TXObase-TXO)$ between a refrigerant evaporation temperature TXObase of the outdoor heat exchanger in non-frosting and a refrigerant evaporation temperature TXO of the outdoor heat exchanger, the control means corrects an indoor air ratio of the air to be introduced into the air flow passage by the suction changing damper in an increasing direction in accordance with increase of the difference $\Delta TXO$.

When the indoor air ratio of the air to be introduced into the air flow passage increases, a heating load decreases, a required heating capability therefore deteriorates, a compressor number of revolution therefore also decreases, and a quantity of heat to be absorbed in the outdoor heat exchanger also decreases. Consequently, similarly in a situation where frosting occurs onto the outdoor heat exchanger, the vehicle air conditioning device delays proceeding of the frosting onto the outdoor heat exchanger, thereby making it possible to eliminate or inhibit deterioration of the heating capability due to the frosting.

According to the invention of claim 5, a vehicle air conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor blower to blow outdoor air through this outdoor heat exchanger, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and in the vehicle air conditioning device, on the basis of a difference $\Delta TXO=(TXObase-TXO)$ between a refrigerant evaporation temperature TXObase of the outdoor heat exchanger in non-frosting and a refrigerant evaporation temperature TXO of the outdoor heat exchanger, the control means corrects an air volume of the outdoor blower in an increasing direction in accordance with increase of the difference $\Delta TXO$.

When the air volume of the outdoor blower increases, an operation pressure (an evaporation temperature) of the outdoor heat exchanger also increases, and hence frosting is hard to occur onto the outdoor heat exchanger. Consequently, similarly in a situation where the frosting occurs onto the outdoor heat exchanger, the vehicle air conditioning device delays proceeding of the frosting onto the outdoor heat exchanger, thereby making it possible to eliminate or inhibit deterioration of a heating capability due to the frosting.

According to the invention of claim 6, a vehicle air conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and in the vehicle air conditioning device, the control means corrects a target subcool degree TGSC that is a target value of a subcool degree of the refrigerant in the radiator in an increasing direction at an early stage of start.

At the early stage of start of the vehicle air conditioning device or at the early stage of start of the heating mode, a compressor number of revolution is also easy to heighten, and frosting easily occurs onto the outdoor heat exchanger, but in this situation, the target subcool degree TGSC of the radiator increases at such an early stage of start, thereby increasing a radiator pressure (a high pressure side pressure) in the same manner as described above. Consequently, the compressor number of revolution also decreases, an outdoor heat exchanger pressure (a low pressure side pressure) also increases, the frosting is hard to occur onto the outdoor heat exchanger, and hence the vehicle air conditioning device delays proceeding of the frosting onto the outdoor heat exchanger, thereby making it possible to eliminate or inhibit deterioration of a heating capability due to the frosting.

According to the invention of claim 7, a vehicle air conditioning device includes a compressor which compresses a refrigerant, an air flow passage through which air to be supplied to a vehicle interior flows, an indoor blower to supply the air to this air flow passage, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and in the vehicle air conditioning device, the control means does not increase an air volume of the indoor blower and/or decreases an upper limit of controlling of a compressor number of revolution, until a high pressure side pressure increases to a predetermined value.

The air volume of the indoor blower does not increase, and hence it is possible to increase a radiator pressure (the high pressure side pressure) earlier, thereby also increasing an outdoor heat exchanger pressure (a low pressure side pressure), also raising a temperature of the outdoor heat exchanger, and making it possible to delay proceeding of frosting. Furthermore, also by decreasing the upper limit of controlling of the compressor number of revolution, it is possible to prevent excessive decrease of the outdoor heat exchanger pressure (the low pressure side pressure), and hence the vehicle air conditioning device executes these operations together in a situation where the frosting occurs onto the outdoor heat exchanger, and delays the proceeding of the frosting onto the outdoor heat exchanger, thereby making it possible to eliminate or inhibit the deterioration of a heating capability due to the frosting.

According to the invention of claim 8, a vehicle air conditioning device includes a compressor which compresses a refrigerant, an air flow passage through which air to be supplied to a vehicle interior flows, an indoor blower to supply the air to this air flow passage, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and in the vehicle air conditioning device, the control means decreases an air volume of the indoor blower in a case where a suction refrigerant temperature $T_s$ of the compressor lowers to a predetermined value or in a case where a refrigerant evaporation temperature $T_{XO}$ of the outdoor heat exchanger lowers to a predetermined value.

When frosting starts onto the outdoor heat exchanger in the heating mode, the suction refrigerant temperature $T_s$ of the compressor or the refrigerant evaporation temperature $T_{XO}$ of the outdoor heat exchanger lowers, and hence the control means decreases the air volume of the indoor blower. When the air volume of the indoor blower decreases, a required heating capability decreases in the same manner as described above, a compressor number of revolution therefore also decreases, and a quantity of heat to be absorbed in the outdoor heat exchanger also decreases. Consequently, in such a situation where the frosting occurs onto the outdoor heat exchanger, the vehicle air conditioning device delays proceeding of the frosting onto the outdoor heat exchanger, thereby making it possible to eliminate or inhibit the deterioration of the heating capability due to the frosting.

According to the invention of claim 9, a vehicle air conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and in the vehicle air conditioning device, the control means adjusts a compressor number of revolution to maintain a suction refrigerant temperature Ts of the compressor or a refrigerant evaporation temperature TXO of the outdoor heat exchanger at a predetermined value.

The control means adjusts the compressor number of revolution to maintain the suction refrigerant temperature Ts of the compressor or the refrigerant evaporation temperature TXO of the outdoor heat exchanger at the predetermined value, which prevents the disadvantage that the temperature lowers to easily cause frosting, thereby making it possible to eliminate or inhibit deterioration of a heating capability due to the frosting.

According to the invention of claim 10, a vehicle air conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and in the vehicle air conditioning device, the control means decreases an upper limit of controlling of a compressor number of revolution in a case where a suction refrigerant temperature Ts of the compressor or a refrigerant evaporation temperature TXO of the outdoor heat exchanger lowers to a predetermined value.

When the upper limit of controlling of the compressor number of revolution decreases, a quantity of heat to be absorbed in the outdoor heat exchanger also decreases, and hence in a situation where frosting occurs onto the outdoor heat exchanger in the same manner as described above, the vehicle air conditioning device delays proceeding of the frosting onto the outdoor heat exchanger, thereby making it possible to eliminate or inhibit deterioration of a heating capability due to the frosting.

According to the invention of claim 11, a vehicle air conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor blower to blow outdoor air through this outdoor heat exchanger, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and in the vehicle air conditioning device, the control means increases an air volume of the outdoor blower in a case where a suction refrigerant temperature Ts of the compressor or a refrigerant evaporation temperature TXO of the outdoor heat exchanger lowers to a predetermined value.

When the air volume of the outdoor blower increases, an operation pressure (an evaporation temperature) of the outdoor heat exchanger also increases, and hence frosting is hard to occur onto the outdoor heat exchanger. Consequently, in the same manner as described above, in a situation where the frosting occurs onto the outdoor heat exchanger, the vehicle air conditioning device delays proceeding of the frosting onto the outdoor heat exchanger, thereby making it possible to eliminate or inhibit deterioration of a heating capability due to the frosting.

According to the invention of claim 12, a vehicle air conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, auxiliary heating means for heating the air to be supplied from the air flow passage to the vehicle interior, and control means, the vehicle air conditioning device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, the control means operates the auxiliary heating means in a case where an outdoor air temperature is low at an early stage of start.

At the early stage of start of the vehicle air conditioning device or at the early stage of start of the heating mode in a situation where the outdoor air temperature is low, a compressor number of revolution is also easy to heighten, and frosting easily occurs onto the outdoor heat exchanger, but in this situation, the control means operates the auxiliary heating means at such an early stage of start, thereby making it possible to decrease the compressor number of revolution. Consequently, an outdoor heat exchanger pressure (a low pressure side pressure) also increases, a temperature thereof also rises, and the frosting is hard to occur onto the outdoor heat exchanger, so that the vehicle air conditioning device delays proceeding of the frosting onto the outdoor heat exchanger, thereby making it possible to eliminate or inhibit deterioration of a heating capability due to the frosting.

MODE FOR CARRYING OUT THE INVENTION

Hereinafter, embodiments of the present invention will be described in detail with reference to the drawings.

Embodiment 1

Figure 1:
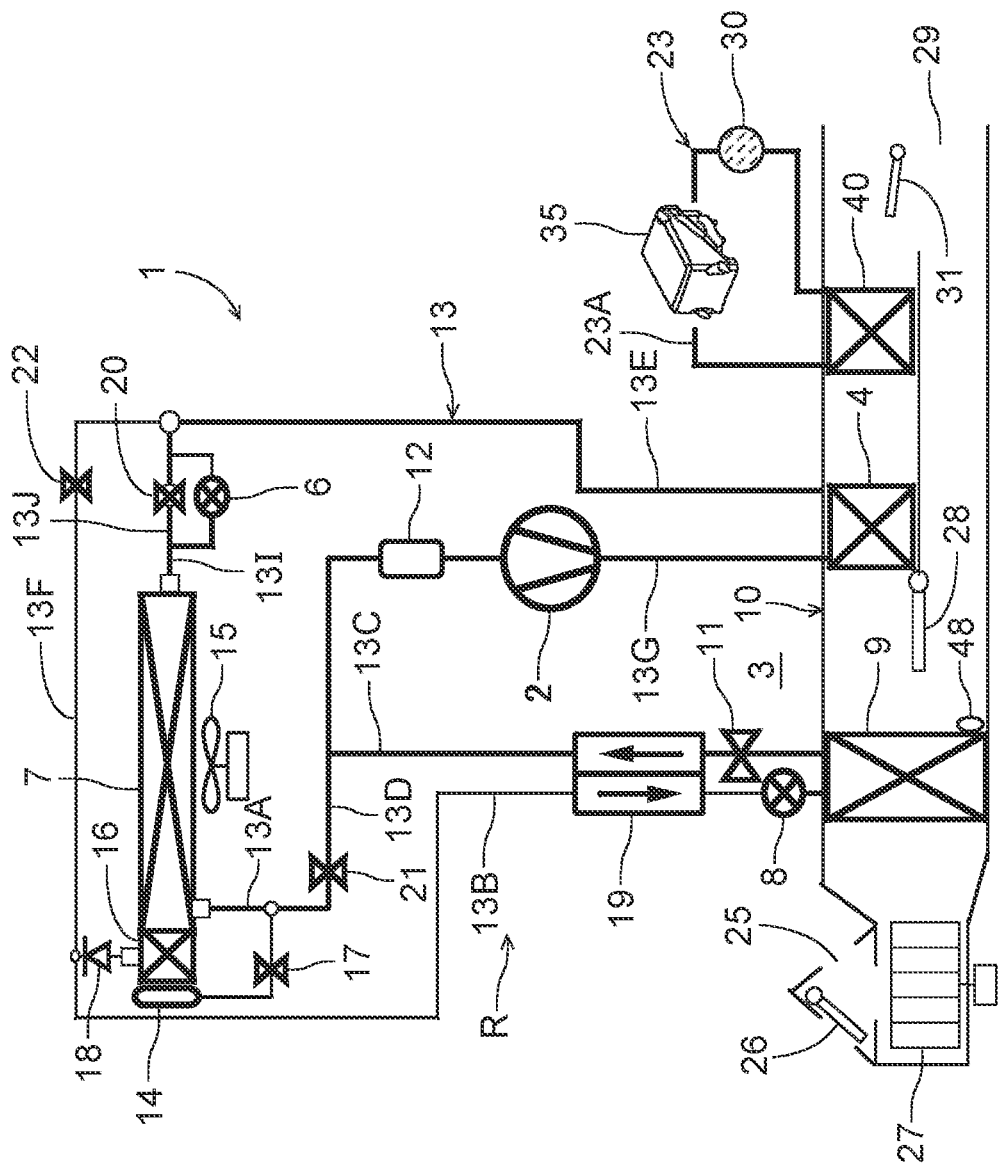
FIG. 1 is a constitutional view of a vehicle air conditioning device of one embodiment to which the present invention is applied.

FIG. 1 shows a constitutional view of one embodiment of a vehicle air conditioning device 1 to which the present invention is applied. A vehicle of the embodiment to which the present invention is applied is an electric car (EV) in which an engine (an internal combustion engine) is mounted and which runs by driving an electric motor for running with power charged in a battery (which is not shown in the drawing), and the vehicle air conditioning device 1 of the present invention is also driven with the power of the battery. That is, the vehicle air conditioning device 1 of the embodiment performs heating by a heat pump operation using a refrigerant circuit in an electric car in which it is not possible to perform heating by engine waste heat, and further, the vehicle air conditioning device 1 selectively executes respective operation modes of dehumidifying and heating, cooling and dehumidifying, cooling, and the like.

It is to be noted that the vehicle is not limited to the electric car, and the present invention is also effective for a so-called hybrid car using the engine together with the electric motor for running, and furthermore, needless to say, the present invention is also applicable to a usual car which runs with the engine.

The vehicle air conditioning device 1 of the embodiment performs air conditioning (heating, cooling, dehumidifying, and ventilation) of a vehicle interior of the electric car, and there are successively connected, by a refrigerant pipe 13, an electric type of compressor 2 which compresses a refrigerant, a radiator 4 disposed in an air flow passage 3 of an HVAC unit 10 in which vehicle interior air passes and circulates, to let the high-temperature high-pressure refrigerant discharged from the compressor 2 flow inside via a refrigerant pipe 13G and to let this refrigerant radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying, an evaporation capability control valve 11 which adjusts an evaporation capability in the heat absorber 9, an accumulator 12 and the like, thereby constituting a refrigerant circuit R.

It is to be noted that in the outdoor heat exchanger 7, an outdoor blower 15 is disposed. The outdoor blower 15 is constituted to forcibly blow the outdoor air through the outdoor heat exchanger 7, thereby performing heat exchange between the outdoor air and the refrigerant, and consequently, the outdoor blower blows the outdoor air through the outdoor heat exchanger 7 also during stop (i.e., a velocity VSP is 0 km/h).

Furthermore, the outdoor heat exchanger 7 has a receiver drier portion 14 and a subcooling portion 16 successively on a refrigerant downstream side, a refrigerant pipe 13A extending out from the outdoor heat exchanger 7 is connected to the receiver drier portion 14 via a solenoid valve (an opening/closing valve) 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

Furthermore, a refrigerant pipe 13B between the check valve 18 and the indoor expansion valve 8 is disposed in a heat exchange relation with a refrigerant pipe 13C extending out from the evaporation capability control valve 11 positioned on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9 through the evaporation capability control valve 11.

Furthermore, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve (an opening/closing valve) 21 to be opened during the heating. Furthermore, a refrigerant pipe 13E on an outlet side of the radiator 4 branches before the outdoor expansion valve 6, and this branching refrigerant pipe 13F communicates and connects with the refrigerant pipe 13B on a downstream side of the check valve 18 via a solenoid valve (an opening/closing valve) 22 to be opened during the dehumidifying.

Furthermore, the outdoor expansion valve 6 is connected in parallel with a bypass pipe 13J, and in the bypass pipe 13J, a solenoid valve (an opening/closing valve) 20 is interposed to open in a cooling mode so that the refrigerant bypasses the outdoor expansion valve 6 to flow. It is to be noted that a pipe between the outdoor expansion valve 6 and the solenoid valve 20 and the outdoor heat exchanger 7 is denoted with 13I.

Furthermore, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode) and further to adjust their ratio (an indoor/outdoor air ratio). Further, on an air downstream side of the suction changing damper 26, an indoor blower (a blower fan) 27 is disposed to supply the introduced indoor air or outdoor air to the air flow passage 3.

Furthermore, in FIG. 1, reference numeral 23 indicates a heating medium circulating circuit as auxiliary heating means disposed in the vehicle air conditioning device 1 of the embodiment. The heating medium circulating circuit 23 includes a circulating pump 30 constituting circulating means, a heating medium heating electric heater 35, and a heating medium-air heat exchanger 40 disposed in the air flow passage 3 on an air downstream side of the radiator 4 to the flow of the air of the air flow passage 3, and these components are successively annularly connected to one another by a heating medium pipe 23A. It is to be noted that as the heating medium to circulate in the heating medium circulating circuit 23, for example, water, a refrigerant such as HFO-1234yf, a coolant or the like is employed.

Further, when the circulating pump 30 is operated and the heating medium heating electric heater 35 is energized to generate heat (when the heating medium circulating circuit 23 operates), the heating medium heated by the heating medium heating electric heater 35 circulates through the heating medium-air heat exchanger 40. That is, the heating medium-air heat exchanger 40 of the heating medium circulating circuit 23 becomes a so-called heater core, and complements the heating of the vehicle interior. The employing of the heating medium circulating circuit 23 can improve electric safety of a passenger.

Furthermore, in the air flow passage 3 on the air upstream side of the radiator 4, an air mix damper 28 is disposed to adjust a degree of flow of the indoor air or the outdoor air through the radiator 4. Furthermore, in the air flow passage 3 on the air downstream side of the radiator 4, there is formed each outlet (represented by an outlet 29 in FIG. 1) of foot, vent or defroster, and in the outlet 29, in outlet changing damper is disposed to execute changing control of blowing of the air from each outlet mentioned above.

Figure 2:
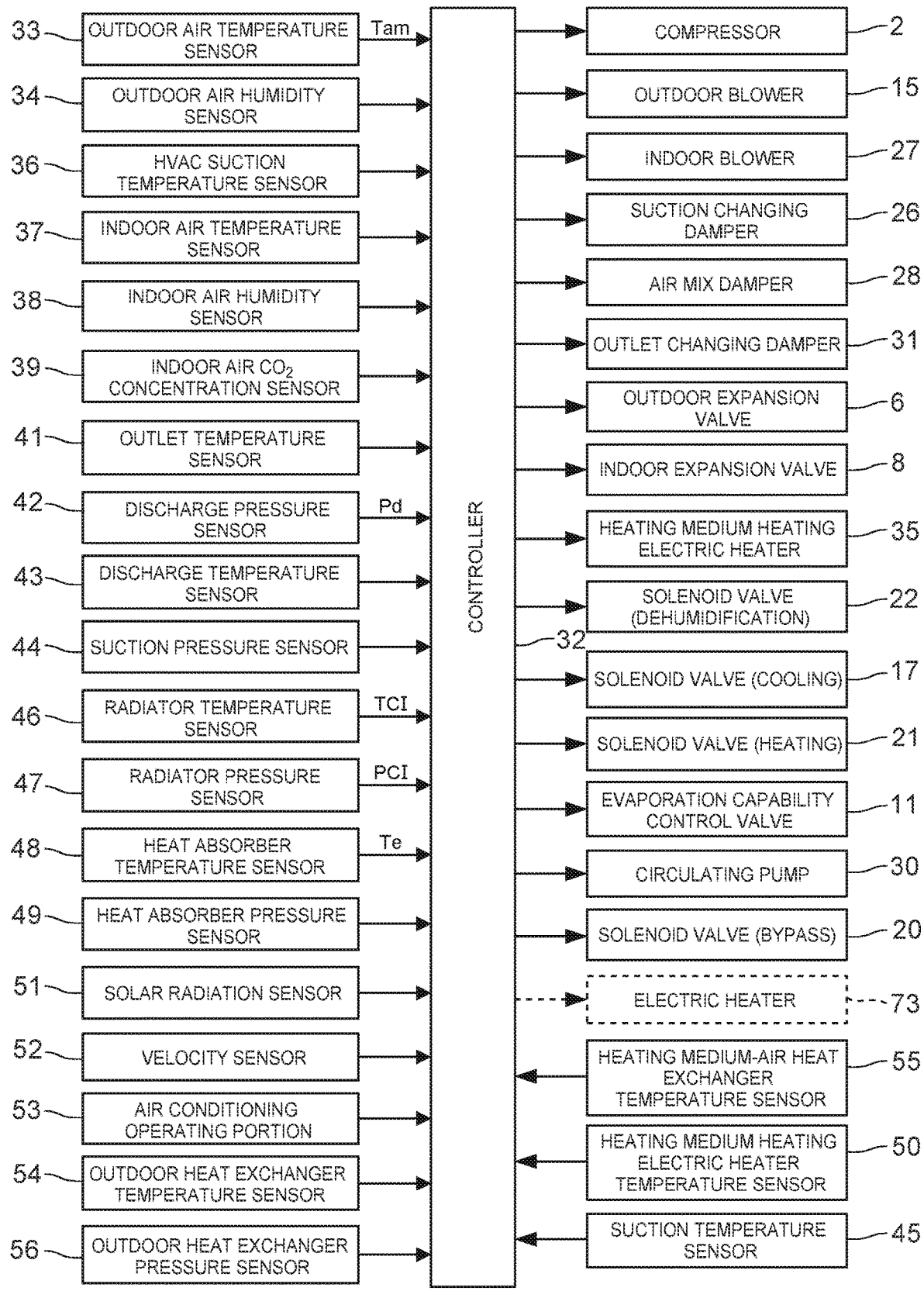
FIG. 2 is a block diagram of an electric circuit of a controller of the vehicle air conditioning device of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity of the vehicle, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air blown out from the outlet 29 to the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a suction temperature sensor 45 which detects a suction refrigerant temperature Ts of the compressor 2, a radiator temperature sensor 46 which detects a temperature of the radiator 4 (the temperature of the air passed through the radiator 4 or the temperature of the radiator 4 itself), a radiator pressure sensor 47 which detects a refrigerant pressure of the radiator 4 (the pressure in the radiator 4 or of the refrigerant which has just flowed out from the radiator 4), a heat absorber temperature sensor 48 which detects a temperature of the heat absorber 9 (the temperature of the air passed through the heat absorber 9 or the temperature of the heat absorber 9 itself), a heat absorber pressure sensor 49 which detects a refrigerant pressure of the heat absorber 9 (the pressure in the heat absorber 9 or of the refrigerant which has just flowed out from the heat absorber 9), a solar radiation sensor 51 of, e.g., a photo sensor system to detect a solar radiation amount into the vehicle, a velocity sensor 52 to detect a moving speed of the vehicle (a velocity), an air conditioning operating portion 53 to set the changing of a predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), i.e., a refrigerant evaporation temperature TXO of the outdoor heat exchanger 7, and an outdoor heat exchanger pressure sensor 56 which detects the refrigerant pressure of the outdoor heat exchanger 7 (the pressure in the outdoor heat exchanger 7 or of the refrigerant which has just flowed out from the outdoor heat exchanger 7).

Furthermore, the input of the controller 32 is further connected to respective outputs of a heating medium heating electric heater temperature sensor 50 which detects a temperature of the heating medium heating electric heater 35 of the heating medium circulating circuit 23 (the temperature of the heating medium which has just been heated with the heating medium heating electric heater 35, or the temperature of an unshown electric heater itself disposed in the heating medium heating electric heater 35), and a heating medium-air heat exchanger temperature sensor 55 which detects a temperature of the heating medium-air heat exchanger 40 (the temperature of the air flowing through the heating medium-air heat exchanger 40, or the temperature of the heating medium-air heat exchanger 40 itself).

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17, 21 and 20, the circulating pump 30, the heating medium heating electric heater 35, and the evaporation capability control valve 11. Further, the controller 32 controls these components on the basis of the outputs of the respective sensors and the setting input by the air conditioning operating portion 53.

Next, an operation of the vehicle air conditioning device 1 of the embodiment having the above-mentioned constitution will be described. The controller 32 changes and executes respective roughly divided operation modes such as a heating mode, a dehumidifying and heating mode, an internal cycle mode, a dehumidifying and cooling mode, and a cooling mode. First, flow of the refrigerant in each operation mode will be described.

(1) Heating Mode

When the heating mode is selected by the controller 32 or a manual operation to the air conditioning operating portion 53, the controller 32 opens the solenoid valve 21 and closes the solenoid valve 17, the solenoid valve 22, and the solenoid valve 20. Further, the controller operates the compressor 2 and the respective blowers 15 and 27, and the air mix damper 28 has a state of passing the air blown out from the indoor blower 27 through the radiator 4 and the heating medium-air heat exchanger 40. In consequence, a high-temperature high-pressure gas refrigerant discharged from the compressor 2 flows into the radiator 4. The air in the air flow passage 3 passes through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4, and then flows through the refrigerant pipe 13E to reach the outdoor expansion valve 6. It is to be noted that an operation and function of the heating medium circulating circuit 23 will be described later. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15. That is, the refrigerant circuit R becomes a heat pump and the outdoor heat exchanger 7 functions as an evaporator of the refrigerant. Further, the low-temperature refrigerant flowing out from the outdoor heat exchanger 7 flows through the refrigerant pipe 13A and the solenoid valve 21 and the refrigerant pipe 13D, and flows from the refrigerant pipe 13C into the accumulator 12 to perform gas liquid separation therein, and then the gas refrigerant is sucked into the compressor 2, thereby repeating this circulation. The air heated in the radiator 4 flows through the heating medium-air heat exchanger 40 and is blown out from the outlet 29, thereby performing the heating of the vehicle interior.

The controller 32 controls a number of revolution of the compressor 2 on the basis of a refrigerant pressure of the radiator which is detected by the radiator pressure sensor 47, i.e., a radiator pressure PCI (the high pressure side pressure of the refrigerant circuit R), also controls a valve position of the outdoor expansion valve 6 on the basis of a subcool degree of the refrigerant calculated from a temperature of the radiator 4 (a radiator temperature TCI) which is detected by the radiator temperature sensor 46 and the radiator pressure PCI, and controls a subcool degree SC of the refrigerant in the outlet of the radiator 4.

(2) Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior. The controller 32 controls the number of revolution of the compressor 2 on the basis of the radiator pressure PCI detected by the radiator pressure sensor 47, and also controls the valve position of the outdoor expansion valve 6 on the basis of the temperature of the heat absorber 9 which is detected by the heat absorber temperature sensor 48.

(3) Internal Cycle Mode

Next, in the internal cycle mode, the controller 32 shuts off the outdoor expansion valve 6 in the above state of the dehumidifying and heating mode (a shut off position), and also closes the solenoid valves 20 and 21. When the outdoor expansion valve 6 and the solenoid valves 20 and 21 close, inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Further, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence the heat is not pumped up from the outdoor air, but a heating capability for a consumed power of the compressor 2 is exerted. The whole amount of the refrigerant flows through the heat absorber 9 which exerts a dehumidifying operation, and hence as compared with the above dehumidifying and heating mode, a dehumidifying capability is higher, but the heating capability lowers.

The controller 32 controls the number of revolution of the compressor 2 on the basis of the temperature of the heat absorber 9 or the above-mentioned radiator pressure PCI. At this time, the controller 32 selects a smaller compressor target number of revolution from compressor target numbers of revolution obtainable by calculations from the temperature of the heat absorber 9 or the radiator pressure PCI, to control the compressor 2.

(4) Dehumidifying and Cooling Mode

Next, in the dehumidifying and cooling mode, the controller 32 opens the solenoid valve 17 and closes the solenoid valve 21, the solenoid valve 22 and the solenoid valve 20. Further, the controller operates the compressor 2 and the respective blowers 15 and 27, and the air mix damper 28 has the state of passing the air blown out from the indoor blower 27 through the radiator 4 and the heating medium-air heat exchanger 40. In consequence, the high-temperature high-pressure gas refrigerant discharged from the compressor 2 flows into the radiator 4. Through the radiator 4, the air in the air flow passage 3 passes, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior. The controller 32 controls the number of revolution of the compressor 2 on the basis of the temperature of the heat absorber 9 which is detected by the heat absorber temperature sensor 48, and also controls the valve position of the outdoor expansion valve 6 on the basis of the above-mentioned radiator pressure PCI.

(5) Cooling Mode

Next, in the cooling mode, the controller 32 opens the solenoid valve 20 in the above state of the dehumidifying and cooling mode (in this case, the outdoor expansion valve 6 may have any valve position including full open (the valve position is an upper limit of controlling)), and the air mix damper 28 has a state where the air does not pass through the radiator 4 and the heating medium-air heat exchanger 40. In consequence, the high-temperature high-pressure gas refrigerant discharged from the compressor 2 flows into the radiator 4. The air in the air flow passage 3 does not pass through the radiator 4, the refrigerant therefore only passes the radiator, and the refrigerant flowing out from the radiator 4 flows through the refrigerant pipe 13E to reach the solenoid valve 20 and the outdoor expansion valve 6.

At this time, the solenoid valve 20 is open, and hence the refrigerant bypasses the outdoor expansion valve 6 to pass the bypass pipe 13J, and flows into the outdoor heat exchanger 7 as it is, in which the refrigerant is cooled by the running therein or the outdoor air passing through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by the heat absorbing operation at this time, and hence the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 to the vehicle interior, thereby performing cooling of the vehicle interior. In this cooling mode, the controller 32 controls the number of revolution of the compressor 2 on the basis of the temperature of the heat absorber 9 which is detected by the heat absorber temperature sensor 48.

(6) Control Block of Compressor and Outdoor Expansion Valve in Heating Mode

Figure 3:
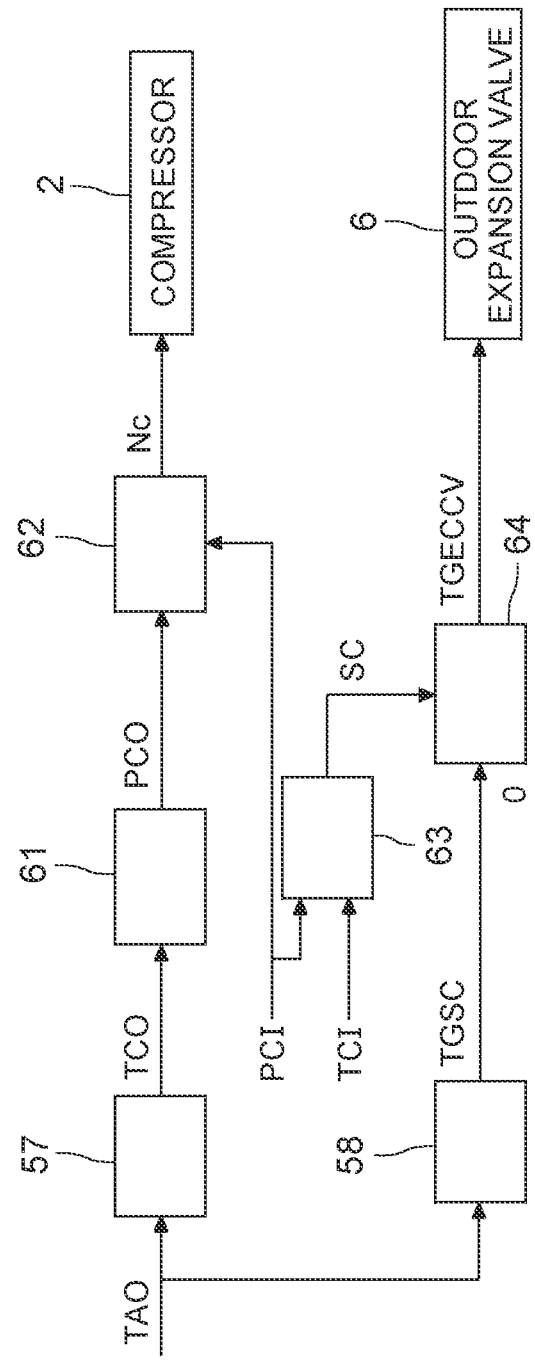
FIG. 3 is a control block diagram of the controller of FIG. 2.

FIG. 3 is a control block diagram of the compressor 2 and the outdoor expansion valve 6 by the controller 32 in the above heating mode. The controller 32 inputs a target outlet temperature TAO into a target radiator temperature calculation section 57 and a target radiator subcool degree calculation section 58. The target outlet temperature TAO is a target value of the temperature of the air blown out from the outlet 29 to the vehicle interior, and is calculated from Equation (1) mentioned below by the controller 32.

$$TAO = (Tset - Tin) \times K + Tbal(f(Tset, SUN, Tam)) \quad (I),$$

in which Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and an outdoor air temperature Tam detected by the outdoor air temperature sensor 33. Further, in general, the lower the outdoor air temperature Tam is, the higher the target outlet temperature TAO becomes, and the higher the outdoor air temperature Tam is, the lower the target outlet temperature becomes.

The controller 32 calculates a target radiator temperature TCO from the target outlet temperature TAO in the target radiator temperature calculation section 57, and next calculates a target radiator pressure PCO on the basis of the target radiator temperature TCO in a target radiator pressure calculation section 61. Further, on the basis of the target radiator pressure PCO and the pressure (the radiator pressure PCI) of the radiator 4 which is detected by the radiator pressure sensor 47, the controller 32 calculates a number of revolution Nc of the compressor 2 in a compressor revolution number calculation section 62, and operates the compressor 2 at the number of revolution Nc. That is, the controller 32 controls the radiator pressure PCI in accordance with the number of revolution Nc of the compressor 2.

Furthermore, the controller 32 calculates a target subcool degree TGSC of the radiator 4 on the basis of the target outlet temperature TAO in the target radiator subcool degree calculation section 58. On the other hand, the controller 32 calculates a subcool degree of the refrigerant in the radiator 4 (the radiator subcool degree SC) on the basis of the radiator pressure PCI and the temperature of the radiator 4 (the radiator temperature TCI) which is detected by the radiator temperature sensor 46 in a radiator subcool degree calculation section 63. Further, on the basis of the radiator subcool degree SC and the target subcool degree TGSC, the controller calculates a target valve position (a target outdoor expansion valve position TGECCV) of the outdoor expansion valve 6 in a target outdoor expansion valve position calculation section 64. Further, the controller 32 controls the valve position of the outdoor expansion valve 6 into the target outdoor expansion valve position TGECCV.

The radiator subcool degree calculation section 63 of the controller 32 performs the calculation in a direction to increase the target subcool degree TGSC as the target outlet temperature TAO is higher, but the present invention is not limited to this embodiment, and the controller decreases the target subcool degree TGSC as an air volume of the indoor blower 27 is smaller, and further, the controller increases the target subcool degree TGSC in accordance with the refrigerant evaporation temperature TXO of the outdoor heat exchanger 7 or at an early stage of start of the vehicle air conditioning device or an early stage of start of the heating mode.

(7) Heating Mode and Auxiliary Heating by Heating Medium Circulating Circuit (Auxiliary Heating Means) in Heating Mode Furthermore, in a case where the controller 32 judges that the heating capability by the radiator 4 runs short in the heating mode, the controller energizes the heating medium heating electric heater 35 to generate heat, and operates the circulating pump 30, thereby executing heating by the heating medium circulating circuit 23.

When the circulating pump 30 of the heating medium circulating circuit 23 operates and the heating medium heating electric heater 35 energizes, the heating medium (a high-temperature heating medium) heated by the heating medium heating electric heater 35 as described above circulates through the heating medium-air heat exchanger 40, and hence the air flowing through the radiator 4 of the air flow passage 3 heats.

(8) Frosting Delay Control to Outdoor Heat Exchanger in Heating Mode

In the above-mentioned heating mode, the outdoor heat exchanger 7 functions as the evaporator, and hence the water in the outdoor air forms frost to adhere to the outdoor heat exchanger 7. When this frost grows, the frost remarkably obstructs the heat exchange between the outdoor heat exchanger 7 and the passed outdoor air and the refrigerant, and hence an air conditioning performance (the heating capability) deteriorates. To eliminate such a problem, in this embodiment, the controller 32 estimates a frosting condition onto the outdoor heat exchanger 7, and executes frosting delay control described below in a case of judging that the frosting starts (the frosting proceeds).

(8-1) Estimation of Frosting Condition onto Outdoor Heat Exchanger

In this embodiment, the controller 32 estimates the frosting condition of the outdoor heat exchanger 7 on the basis of the current refrigerant evaporation temperature TXO of the outdoor heat exchanger 7 which is obtainable from the outdoor heat exchanger temperature sensor 54, and a refrigerant evaporation temperature TXObase of the outdoor heat exchanger 7 in non-frosting when the outdoor air has a low-humidity environment and the frosting does not occur onto the outdoor heat exchanger 7. In this case, the controller 32 determines the refrigerant evaporation temperature TXObase of the outdoor heat exchanger 7 in non-frosting by use of Equation (II) mentioned next.

$$TXObase = f(Tam, Nc, BLV, VSP) \quad (II)$$
$$= k1 \times Tam + k2 \times Nc + k3 \times BLV + k4 \times VSP$$

Here, Tam which is a parameter of Equation (II) is the outdoor air temperature which is obtainable from the outdoor air temperature sensor 33, Nc is the number of revolution of the compressor 2, BLV is a blower voltage of the indoor blower 27, VSP is a velocity which is obtainable from the velocity sensor 52, and k1 to k4 are coefficients which are beforehand obtained by experiments or the like.

The outdoor air temperature Tam is an index indicating a suction air temperature of the outdoor heat exchanger 7, and when the outdoor air temperature Tam (the suction air temperature of the outdoor heat exchanger 7) becomes lower, TXObase tends to be lower. Therefore, the coefficient k1 is a positive value. It is to be noted that the index indicating the suction air temperature of the outdoor heat exchanger 7 is not limited to the outdoor air temperature Tam.

Furthermore, the number of revolution Nc of the compressor 2 is an index indicating a refrigerant flow rate in the refrigerant circuit R, and when the number of revolution Nc is higher (the refrigerant flow rate is larger), TXObase tends to be lower. Therefore, the coefficient k2 is a negative value.

Furthermore, the blower voltage BLV is an index indicating the volume of the air to be passed through the radiator 4, and when the blower voltage BLV is higher (the volume of the air to be passed through the radiator 4 is larger), TXObase tends to be lower. Therefore, the coefficient k3 is a negative value. It is to be noted that the index indicating the volume of the air to be passed through the radiator 4 is not limited to this index, and a blower air volume of the indoor blower 27 or an opening SW of the air mix damper 28 may be used.

Furthermore, the velocity VSP is an index indicating the velocity of the air to be passed through the outdoor heat exchanger 7, and when the velocity VSP is lower (the velocity of the air to be passed through the outdoor heat exchanger 7 is lower), TXObase tends to be lower. Therefore, the coefficient k4 is a positive value. It is to be noted that the index indicating the velocity of the air to be passed through the outdoor heat exchanger 7 is not limited to this example, and may be a voltage or velocity of the outdoor blower 15.

(8-2) Example (No. 1) of Frosting Delay Control to Outdoor Heat Exchanger

Next, the target radiator subcool degree calculation section 58 of the controller 32 calculates a difference ΔTXO (ΔTXO=TXObase−TXO) on the basis of the refrigerant evaporation temperature TXObase in non-frosting which is obtainable by substituting current values of the respective parameters into Equation (II) and the current refrigerant evaporation temperature TXO, and the section corrects the above target subcool degree TGSC in an increasing direction in accordance with increase of the difference ΔTXO in a case where the refrigerant evaporation temperature TXO becomes lower than the refrigerant evaporation temperature TXObase in non-frosting.

Figure 4:
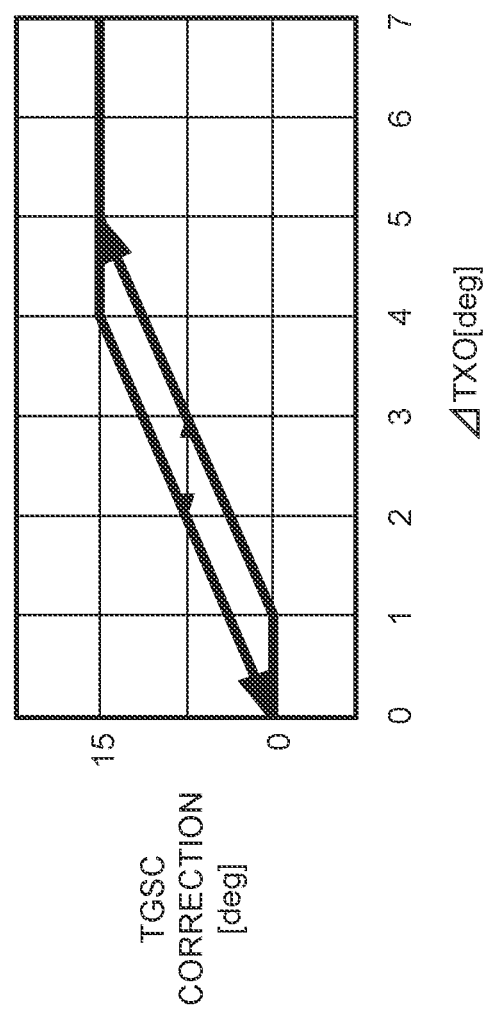
FIG. 4 is a diagram showing a relation between ΔTXO and a TGSC offset to explain one embodiment of frosting delay control to an outdoor heat exchanger by the controller of FIG. 2 (Embodiment 1)

FIG. 4 shows a relation between the difference ΔTXO and an offset of the target subcool degree TGSC in this case. In the embodiment, the target radiator subcool degree calculation section 58 of the controller 32 adjusts the offset of TGSC into 0 until the difference ΔTXO increases from 0 to 1, and increases the offset of TGSC from 0 to 15 with a predetermined inclination in accordance with the increase of the difference ΔTXO from 1 to 5. Furthermore, the section adjusts the offset of TGSC into 15 until the difference ΔTXO decreases from a large value to 4, and decreases the offset of TGSC from 15 to 0 with a predetermined inclination in accordance with the decrease of the difference ΔTXO from 4 to 0.

When the frosting starts onto the outdoor heat exchanger 7 in the heating mode, the refrigerant evaporation temperature TXO of the outdoor heat exchanger 7 lowers to increase the difference ΔTXO=(TXObase−TXO) from the refrigerant evaporation temperature TXObase of the outdoor heat exchanger in non-frosting, and hence the controller 32 corrects the target subcool degree TGSC of the radiator 4 in an increasing direction on the basis of FIG. 4. When the target subcool degree TGSC of the radiator 4 increases, the radiator pressure PCI (the high pressure side pressure) increases, the number of revolution Nc of the compressor 2 therefore decreases, the pressure (the low pressure side pressure) of the outdoor heat exchanger 7 also increases, and the frosting is hard to occur onto the outdoor heat exchanger 7.

Figure 5:
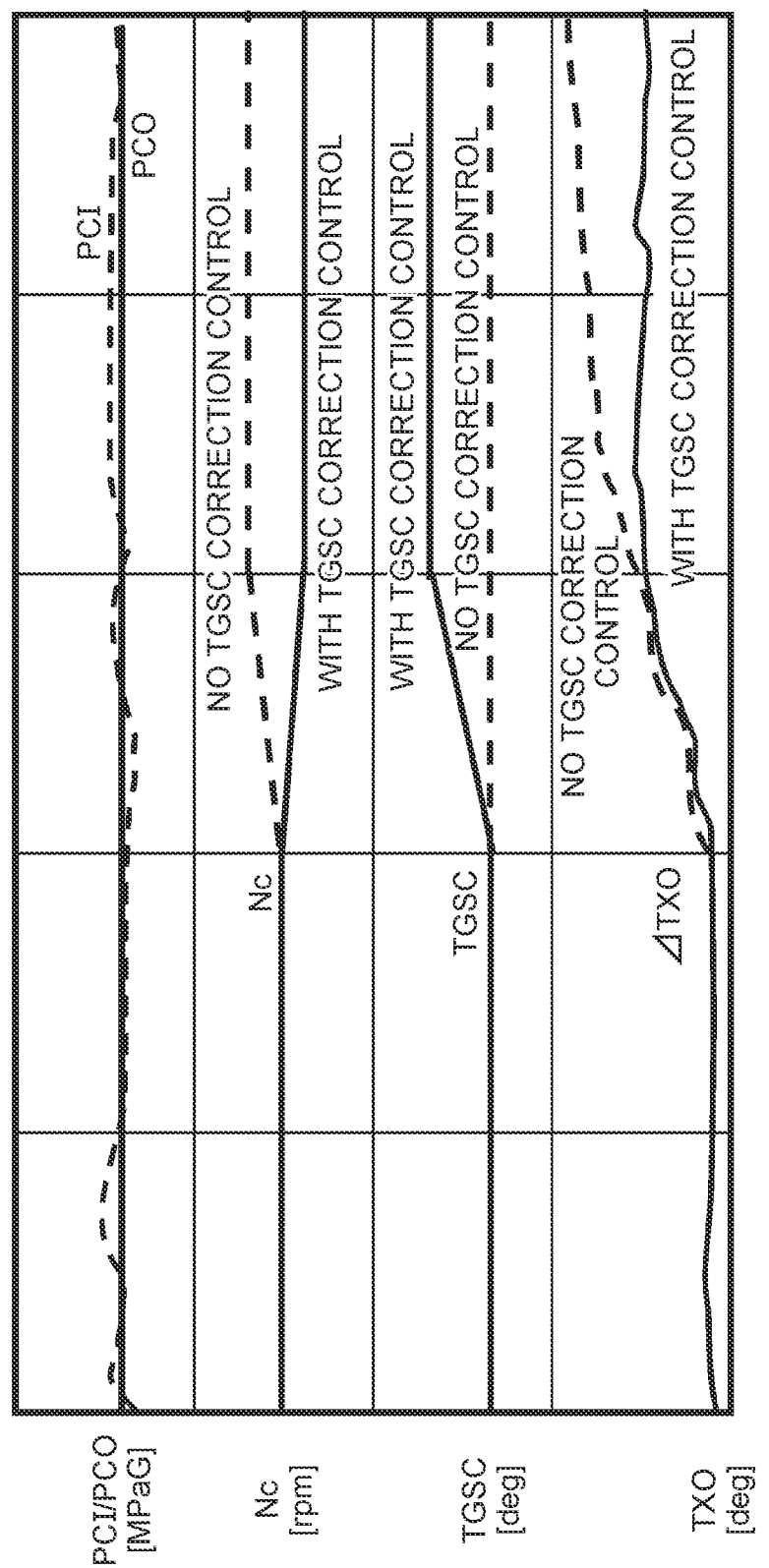
FIG. 5 is a timing chart showing operations, and changes of a pressure and temperature of the vehicle air conditioning device in the case of FIG. 4.

FIG. 5 shows this behavior. In a top stage of the drawing, a solid line shows the target radiator pressure PCO and a broken line shows the radiator pressure PCI. A second stage from the top shows the number of revolution Nc of the compressor 2, a solid line shows a case of executing correction control of the target subcool degree TGSC, and a broken line shows a case where the controller does not execute the correction control. Furthermore, a bottom stage shows the difference ΔTXO, a solid line shows a case of executing the correction control of the target subcool degree TGSC, and a broken line shows a case where the controller does not execute the correction control.

Figure 26:
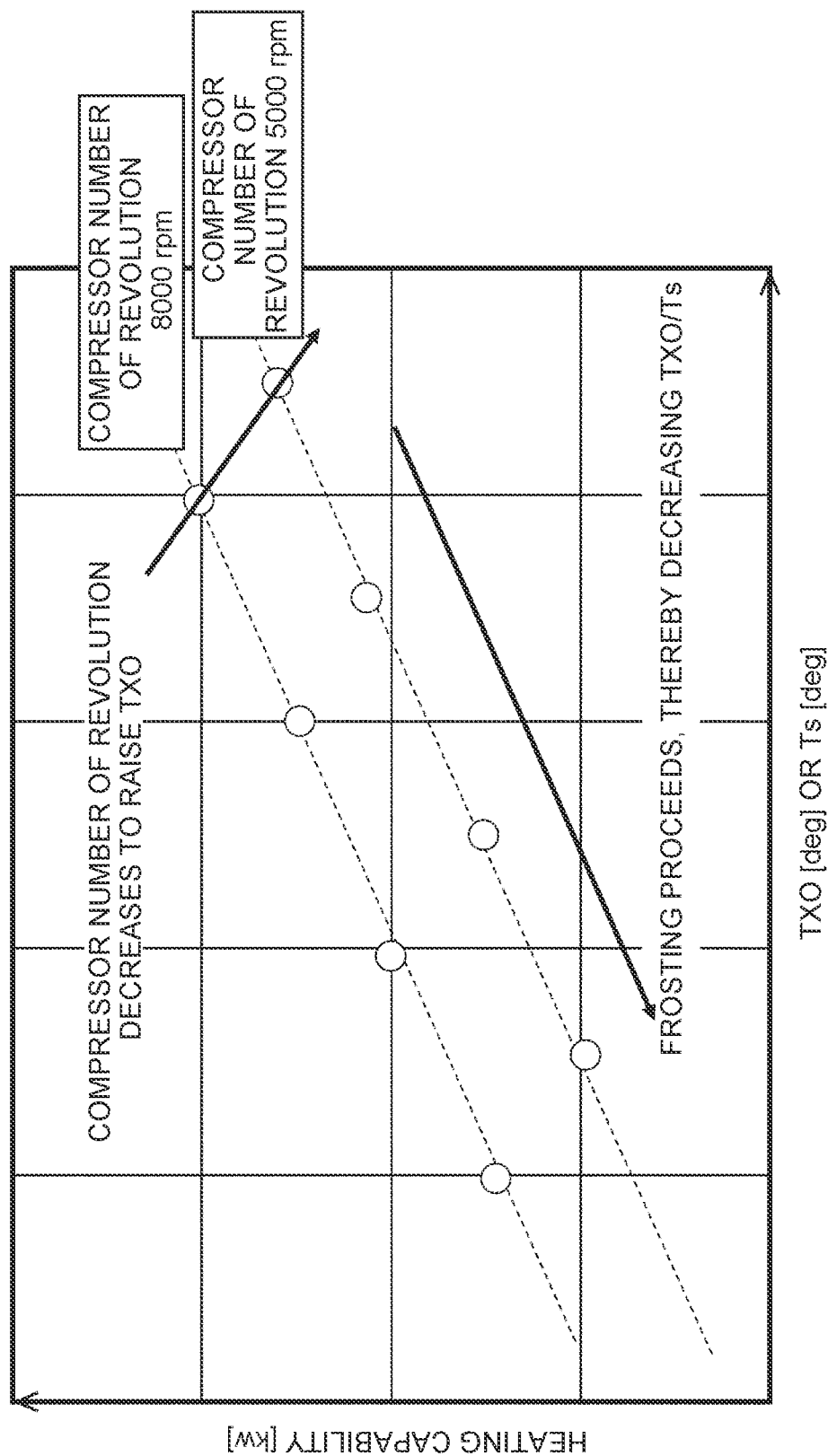
FIG. 26 is a diagram showing a relation between an outdoor heat exchanger refrigerant evaporation temperature TXO and a heating capability.

As in the third stage from the top in this drawing, the controller performs the correction to increase the target subcool degree TGSC, whereby the number of revolution Nc of the compressor 2 decreases as compared with a case where the controller does not perform the correction. As shown in FIG. 26, for example, when the number of revolution Nc of the compressor 2 decreases from 8000 rpm to 5000 rpm under certain conditions, a heat absorbing capability of the outdoor heat exchanger 7 deteriorates, and hence the refrigerant evaporation temperature TXO rises. When the refrigerant evaporation temperature TXO of the outdoor heat exchanger 7 rises, the difference ΔTXO also decreases, i.e., the refrigerant evaporation temperature TXO of the outdoor heat exchanger 7 comes close to the refrigerant evaporation temperature TXObase of the outdoor heat exchanger 7 in non-frosting. Consequently, it is possible to inhibit the frosting onto the outdoor heat exchanger 7 and to delay the proceeding of the frosting, and it is possible to eliminate or inhibit the deterioration of the heating capability due to the frosting of the outdoor heat exchanger 7.

Embodiment 2

(8-3) Example (No. 2) of Frosting Delay Control to Outdoor Heat Exchanger

Figure 6:
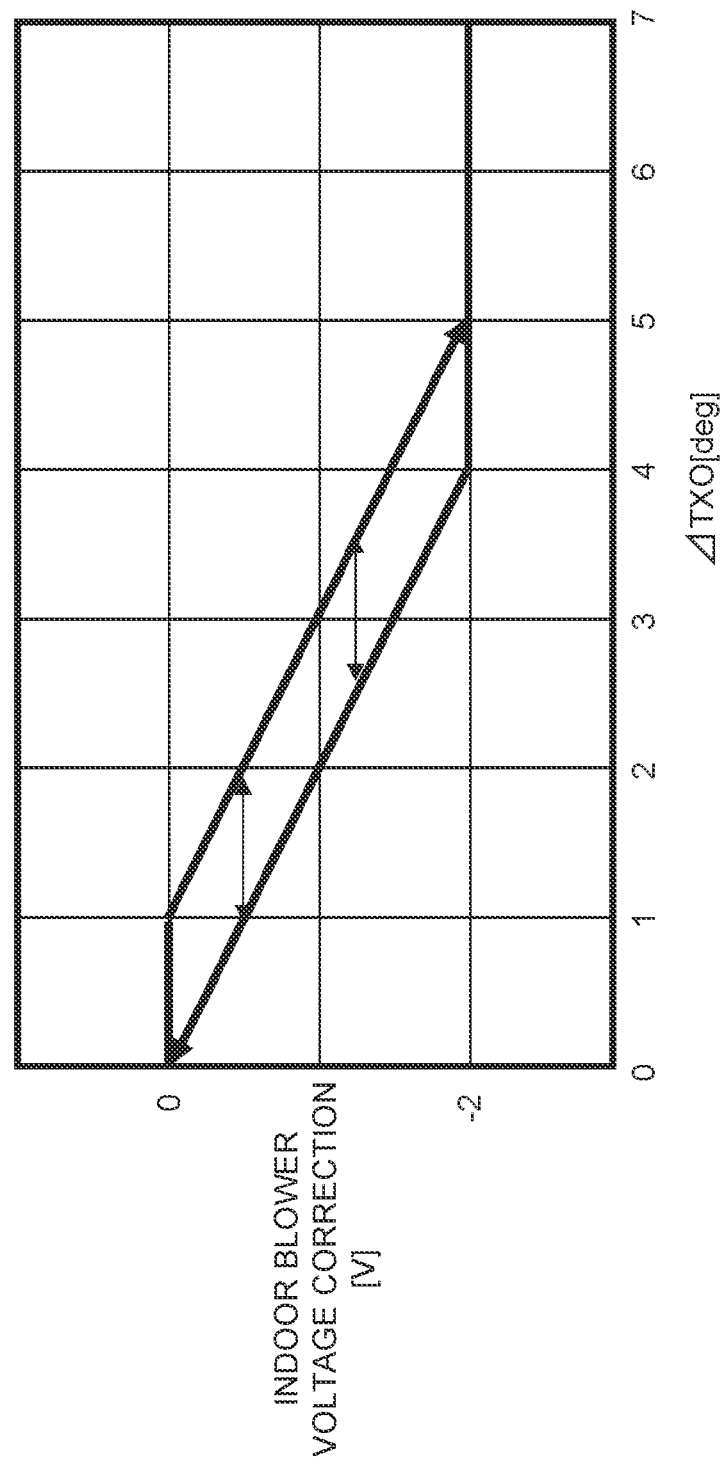
FIG. 6 is a diagram showing a relation between ΔTXO and an indoor blower air volume offset to explain another embodiment of the frosting delay control to the outdoor heat exchanger by the controller of FIG. 2 (Embodiment 2)

Next, FIG. 6 shows another example of frosting delay control to an outdoor heat exchanger 7 by a controller 32. In this case, on the basis of a refrigerant evaporation temperature TXObase of the outdoor heat exchanger 7 in non-frosting and a current refrigerant evaporation temperature TXO of the outdoor heat exchanger 7, the controller 32 corrects an air volume of the above indoor blower 27 in a decreasing direction in accordance with increase of their difference ΔTXO=(TXObase−TXO).

FIG. 6 shows a relation between the difference ΔTXO and an offset of an indoor blower voltage (one example of a value indicating the air volume of the indoor blower 27) in this case. In the embodiment, the controller 32 adjusts the offset of the indoor blower voltage into 0 until the difference ΔTXO increases from 0 to 1, and decreases the offset of the indoor blower voltage from 0 to −2 with a predetermined inclination in accordance with the increase of the difference ΔTXO from 1 to 5. Furthermore, the controller adjusts the offset of the indoor blower voltage into −2 until the difference ΔTXO decreases from a large value to 4, and increases the offset of the indoor blower voltage from −2 to 0 with a predetermined inclination in accordance with the decrease of the difference ΔTXO from 4 to 0.

When frosting starts onto the outdoor heat exchanger 7 in a heating mode, the refrigerant evaporation temperature TXO of the outdoor heat exchanger 7 lowers to increase the difference ΔTXO=(TXObase−TXO) from the refrigerant evaporation temperature TXObase of the outdoor heat exchanger in non-frosting, and hence the controller 32 corrects the air volume of the indoor blower 27 (the indoor blower voltage in the embodiment) in a decreasing direction on the basis of FIG. 6. When the air volume of the indoor blower 27 decreases, a required heating capability decreases, a number of revolution Nc of a compressor 2 therefore also decreases, and a quantity of heat to be absorbed in the outdoor heat exchanger 7 also decreases. Consequently, in a situation where the frosting occurs onto the outdoor heat exchanger 7, a vehicle air conditioning device delays proceeding of the frosting onto the outdoor heat exchanger 7, thereby making it possible to eliminate or inhibit deterioration of the heating capability due to the 2 5 frosting of the outdoor heat exchanger 7.

Embodiment 3

(8-4) Example (No. 3) of Frosting Delay Control to Outdoor Heat Exchanger

Figure 7:
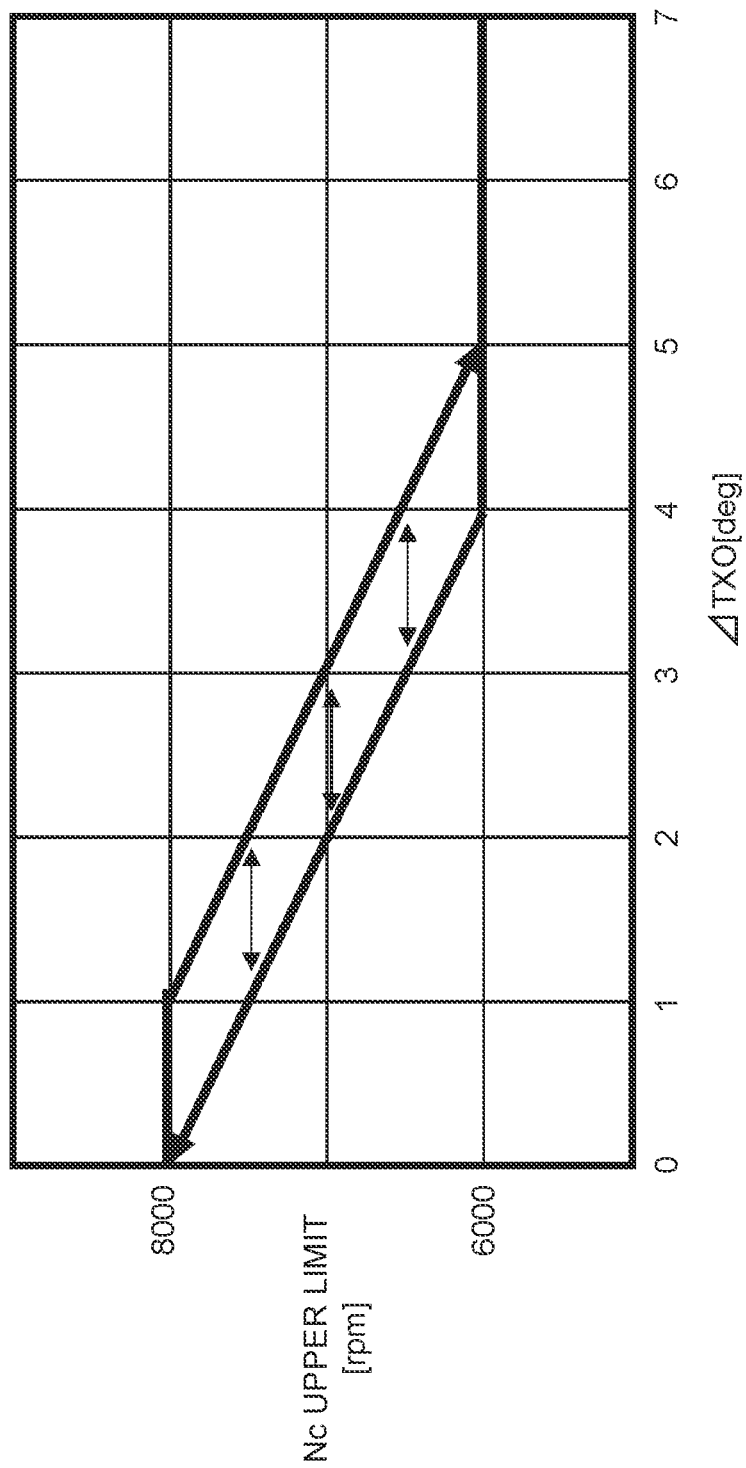
FIG. 7 is a diagram showing a relation between ΔTXO and an upper limit of controlling of a compressor number of revolution to explain still another embodiment of the frosting delay control to the outdoor heat exchanger by the controller of FIG. 2 (Embodiment 3)

Next, FIG. 7 shows still another example of frosting delay control to an outdoor heat exchanger 7 by a controller 32. In this case, on the basis of a refrigerant evaporation temperature TXObase of the outdoor heat exchanger 7 in non-frosting and a current refrigerant evaporation temperature TXO of the outdoor heat exchanger 7, a compressor revolution number calculation section 62 of the controller 32 corrects an upper limit of controlling of a number of revolution of the above compressor 2 in a decreasing direction in accordance with increase of their difference ΔTXO=(TXObase−TXO).

FIG. 7 shows a relation between the difference ΔTXO and the upper limit of controlling of the compressor number of revolution in this case. In the embodiment, the controller 32 adjusts the upper limit of controlling of the number of revolution of the compressor 2 into 8000 rpm until the difference ΔTXO increases from 0 to 1, and decreases the upper limit of controlling from 8000 rpm to 6000 rpm with a predetermined inclination in accordance with the increase of the difference ΔTXO from 1 to 5.

Furthermore, the controller adjusts the upper limit of controlling into 6000 rpm until the difference ΔTXO decreases from a large value to 4, and increases the upper limit of controlling from 6000 rpm to 8000 rpm with a predetermined inclination in accordance with the decrease of the difference ΔTXO from 4 to 0.

When frosting starts onto the outdoor heat exchanger 7 in a heating mode, the refrigerant evaporation temperature TXO of the outdoor heat exchanger 7 lowers to increase the difference ΔTXO=(TXObase−TXO) from the refrigerant evaporation temperature TXObase of the outdoor heat exchanger in non-frosting, and hence the controller 32 corrects the upper limit of controlling of the number of revolution of the compressor 2 in a decreasing direction on the basis of FIG. 7. When the upper limit of controlling of the number of revolution of the compressor 2 decreases, a quantity of heat to be absorbed in the outdoor heat exchanger 7 also decreases, and hence in a situation where the frosting occurs onto the outdoor heat exchanger 7, a vehicle air conditioning device delays proceeding of the frosting onto the outdoor heat exchanger 7, thereby making it possible to eliminate or inhibit deterioration of a heating capability due to the frosting of the outdoor heat exchanger 7.

Embodiment 4

(8-5) Example (No. 4) of Frosting Delay Control to Outdoor Heat Exchanger

Figure 8:
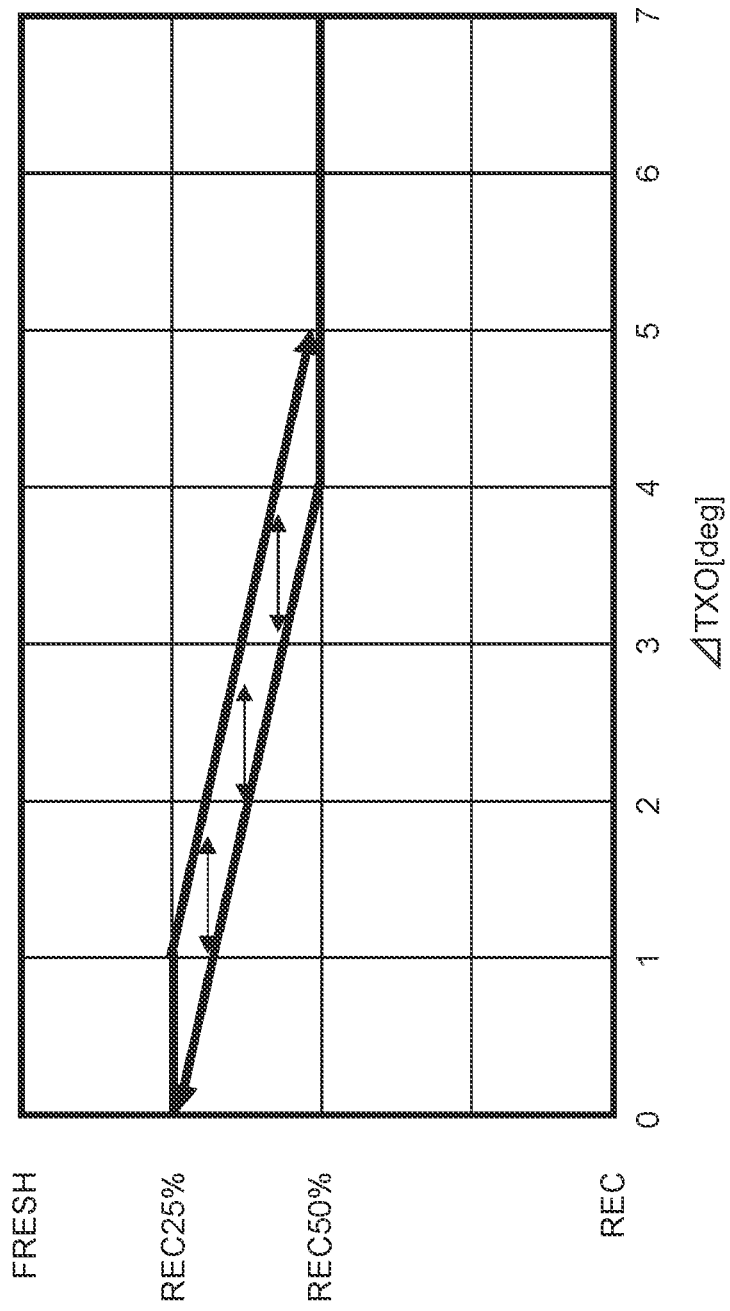
FIG. 8 is a diagram showing a relation between ΔTXO and an indoor air ratio to explain a further embodiment of the frosting delay control to the outdoor heat exchanger by the controller of FIG. 2 (Embodiment 4)

Next, FIG. 8 shows a further example of frosting delay control to an outdoor heat exchanger 7 by a controller 32. In this case, on the basis of a refrigerant evaporation temperature TXObase of the outdoor heat exchanger 7 in non-frosting and a current refrigerant evaporation temperature TXO of the outdoor heat exchanger 7, the controller 32 corrects an indoor air ratio of air to be introduced from the above suction changing damper 26 to an air flow passage 3 in an increasing direction in accordance with increase of their difference ΔTXO=(TXObase−TXO).

FIG. 8 shows a relation between the difference ΔTXO and the indoor air ratio in this case. It is to be noted that in the drawing, REC is indoor air, FRESH is outdoor air, and it is possible to adjust an indoor air ratio of 100%: an outdoor air ratio of 0% (ordinate bottom) into an indoor air ratio of 0%: an outdoor air ratio of 100% (ordinate top) by the suction changing damper 26. In the embodiment, the controller 32 adjusts the indoor air ratio into 25% until the difference ΔTXO increases from 0 to 1, and increases the indoor air ratio to 50% with a predetermined inclination in accordance with the increase of the difference ΔTXO from 1 to 5. Furthermore, the controller adjusts the indoor air ratio into 50% until the difference ΔTXO decreases from a large value to 4, and decreases the indoor air ratio from 50% to 25% with a predetermined inclination in accordance with the decrease of the difference ΔTXO from 4 to 0.

When frosting starts onto the outdoor heat exchanger 7 in a heating mode, the refrigerant evaporation temperature TXO of the outdoor heat exchanger 7 lowers to increase the difference ΔTXO=(TXObase−TXO) from the refrigerant evaporation temperature TXObase of the outdoor heat exchanger in non-frosting, and hence the controller 32 corrects the indoor air ratio of the air to be introduced into the air flow passage 3 in an increasing direction on the basis of FIG. 8. When the indoor air ratio of the air to be introduced into the air flow passage 3 increases, a heating load decreases, a required heating capability therefore decreases, a number of revolution Nc of a compressor 2 therefore also decreases, and a quantity of heat to be absorbed in the outdoor heat exchanger 7 also decreases. Consequently, in a situation where the frosting occurs onto the outdoor heat exchanger 7, a vehicle air conditioning device delays proceeding of the frosting onto the outdoor heat exchanger 7, thereby making it possible to eliminate or inhibit deterioration of the heating capability due to the frosting of the outdoor heat exchanger 7.

Embodiment 5

(8-6) Example (No. 5) of Frosting Delay Control to Outdoor Heat Exchanger

Figure 9:
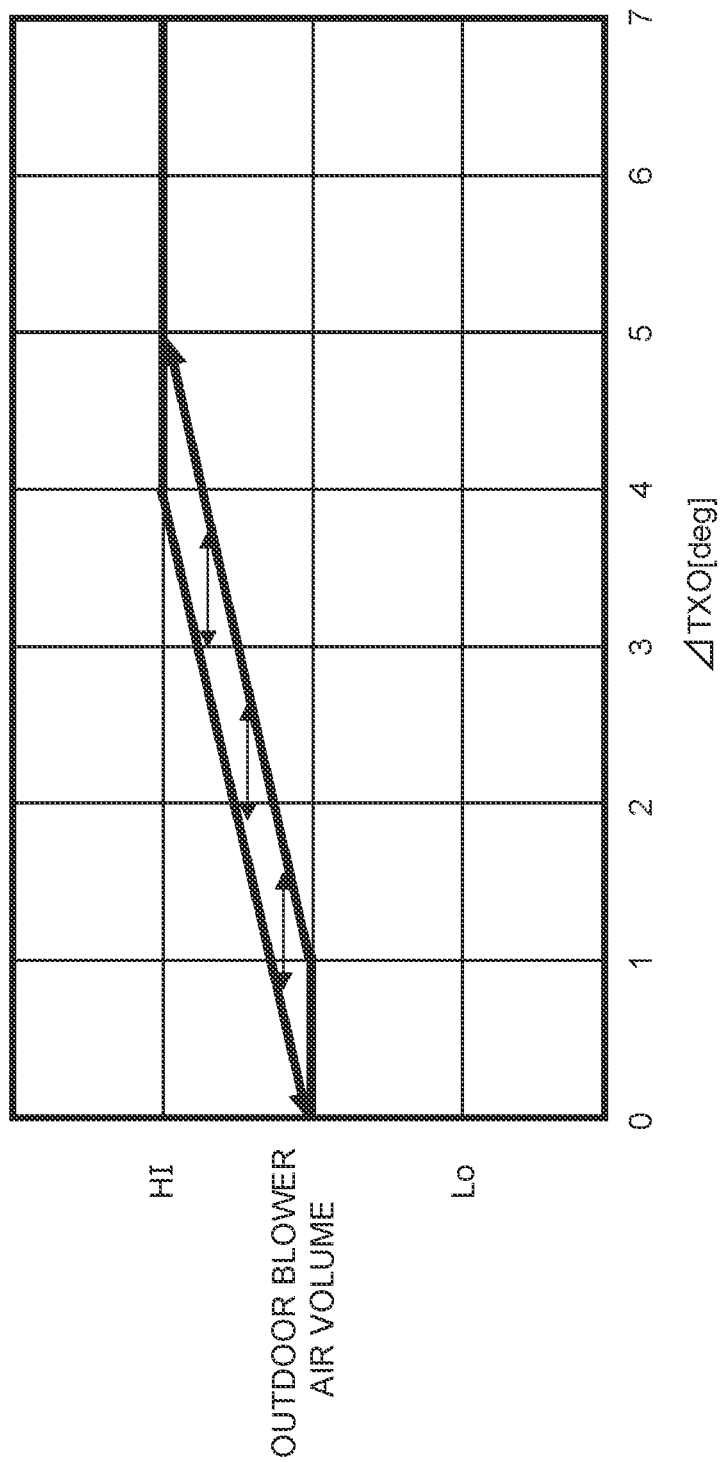
FIG. 9 is a diagram showing a relation between ΔTXO and an outdoor blower air volume (an operation ratio) to explain a further embodiment of the frosting delay control to the outdoor heat exchanger by the controller of FIG. 2 (Embodiment 5)

Next, FIG. 9 shows a further example of frosting delay control to an outdoor heat exchanger 7 by a controller 32. In this case, on the basis of a refrigerant evaporation temperature TXObase of the outdoor heat exchanger 7 in non-frosting and a current refrigerant evaporation temperature TXO of the outdoor heat exchanger 7, the controller 32 corrects an air volume of the above outdoor blower 15 in an increasing direction in accordance with increase of their difference $\Delta TXO=(TXObase-TXO)$.

FIG. 9 shows a relation between the difference $\Delta TXO$ and the air volume (an operation ratio) of the outdoor blower 15 in this case. In the embodiment, the controller 32 adjusts the air volume of the outdoor blower 15 into Lo (the air volume is small) until the difference $\Delta TXO$ increases from 0 to 1, and increases the air volume of the outdoor blower 15 to HI (the air volume is large) with a predetermined inclination in accordance with the increase of the difference $\Delta TXO$ from 1 to 5. Furthermore, the controller adjusts the air volume of the outdoor blower 15 into HI until the difference $\Delta TXO$ decreases from a large value to 4, and decreases the air volume from HI to Lo with a predetermined inclination in accordance with the decrease of the difference $\Delta TXO$ from 4 to 0.

When frosting starts onto the outdoor heat exchanger 7 in a heating mode, the refrigerant evaporation temperature TXO of the outdoor heat exchanger 7 lowers to increase the difference $\Delta TXO=(TXObase-TXO)$ from the refrigerant evaporation temperature TXObase of the outdoor heat exchanger in non-frosting, and hence the controller 32 corrects the air volume of the outdoor blower 15 in an increasing direction on the basis of FIG. 9. When the air volume of the outdoor blower 15 increases, an operation pressure of the outdoor heat exchanger 7 also increases, and hence the frosting is hard to occur onto the outdoor heat exchanger 7. Consequently, in a situation where the frosting occurs onto the outdoor heat exchanger 7, a vehicle air conditioning device delays proceeding of the frosting onto the outdoor heat exchanger 7, thereby making it possible to eliminate or inhibit deterioration of a heating capability due to the frosting of the outdoor heat exchanger 7.

Embodiment 6

(8-7) Example (No. 6) of Frosting Delay Control to Outdoor Heat Exchanger

Next, a further example of frosting delay control to an outdoor heat exchanger 7 by a controller 32 will be described with reference to FIG. 10 to FIG. 13. In this case, the controller 32 corrects a target subcool degree TGSC of a radiator 4 in an increasing direction at an early stage of start of a vehicle air conditioning device 1 or at an early stage of start of a heating mode (a heat-up early stage).

Figure 11:
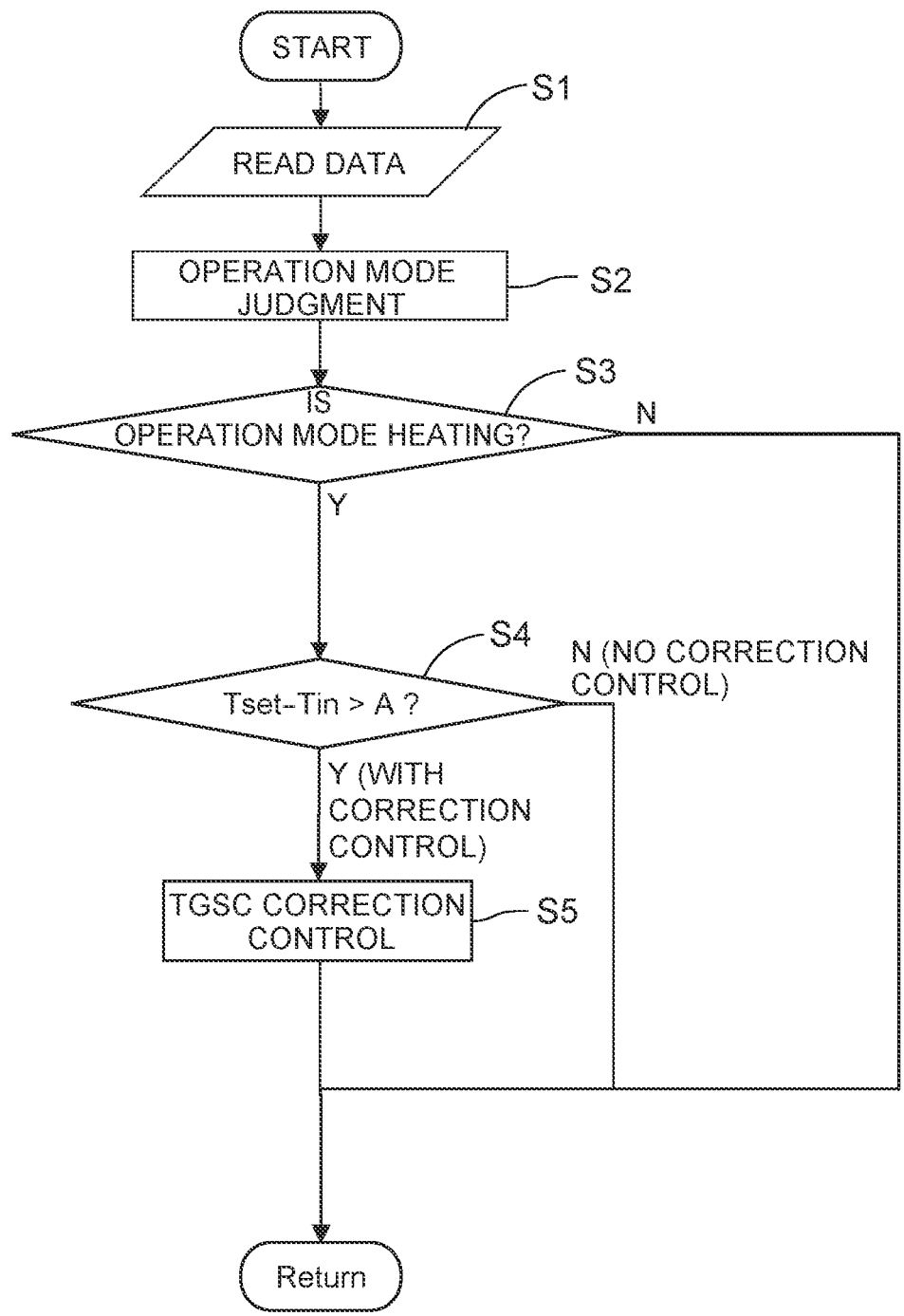
FIG. 11 is a flowchart showing one example of a control flowchart of the controller in the case of FIG. 10.

FIG. 11 shows one example of a flowchart of the controller 32 concerning such frosting delay control. The controller 32 reads data detected by each sensor in step S1 of FIG. 11, and next judges a current operation mode in step S2. Further, in step S3, the controller judges whether or not the current operation mode is a heating mode, and advances to step S4 when the operation mode is the heating mode. In the step S4, the controller compares the above predetermined temperature Tset of a vehicle interior with a temperature Tin of vehicle interior air, and judges whether or not their difference (Tset−Tin) is higher than a predetermined value A.

Figure 10:
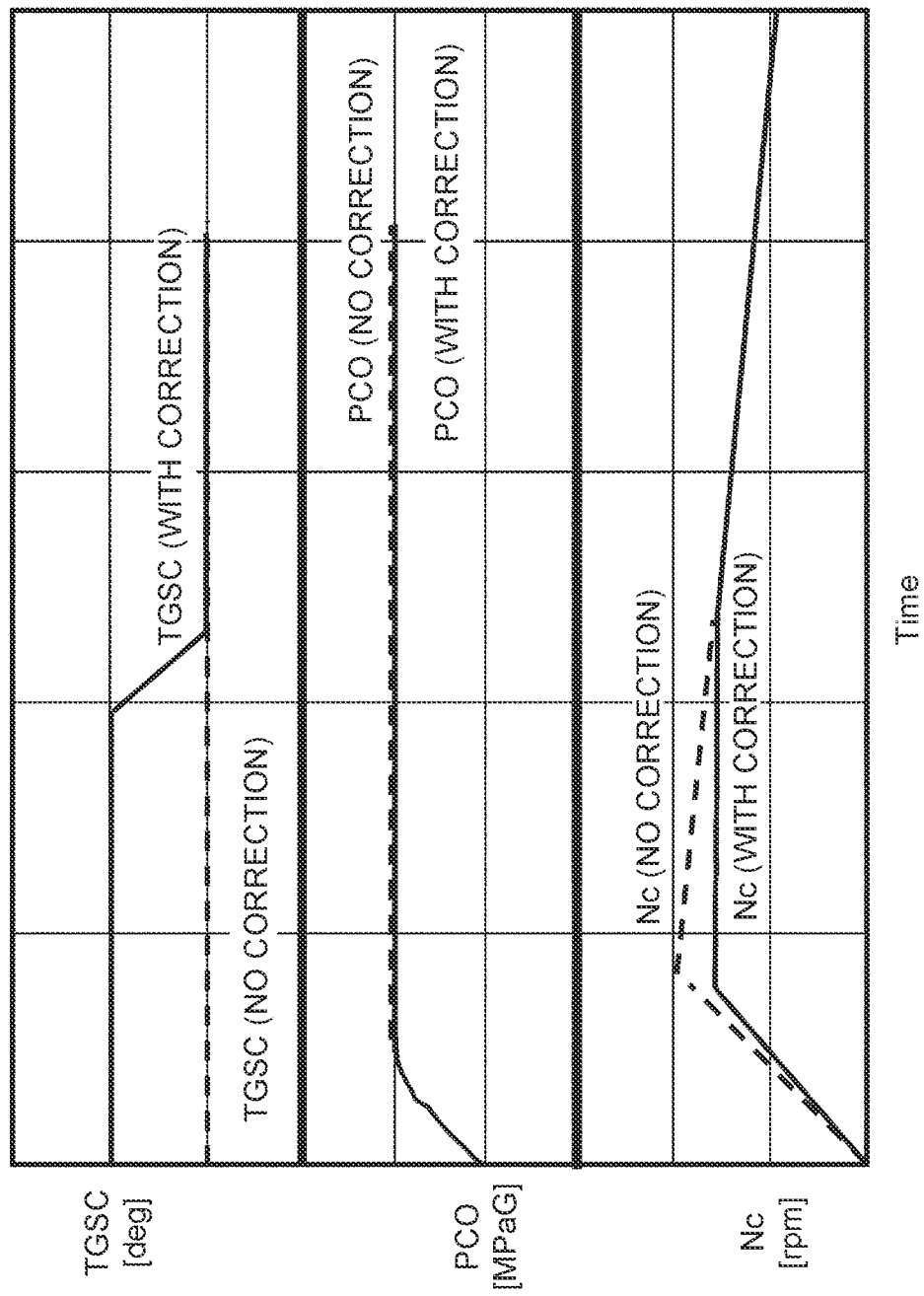
FIG. 10 is a timing chart showing operations, and changes of a pressure and temperature of the vehicle air conditioning device to explain a further embodiment of the frosting delay control to the outdoor heat exchanger by the controller of FIG. 2 (Embodiment 6)

At the early stage of start of the heating mode, the temperature Tin of the vehicle interior air is lower than the predetermined temperature Tset of the vehicle interior and the difference (Tset−Tin) is larger than A, and hence the controller 32 advances from the step S4 to the step S5, and executes control to correct the target subcool degree TGSC in the increasing direction. FIG. 10 shows this behavior. A solid line of the second stage from the top of the drawing shows a target radiator pressure PCO when the controller performs correction control to increase TGSC, and a broken line shows the target radiator pressure PCO when the controller does not perform the correction control. A bottom stage shows a number of revolution Nc of a compressor 2, a solid line shows a case of performing the correction control of the target subcool degree TGSC, and a broken line shows a case where the controller does not perform the correction control.

At the early stage of start of the vehicle air conditioning device 1 or at the early stage of start of the heating mode, the number of revolution Nc of the compressor 2 is easy to heighten (the broken line), and frosting easily occurs onto the outdoor heat exchanger 7, but in this situation, the controller performs correction to increase the target subcool degree TGSC of the radiator 4 at such an early stage of start as in the top stage of FIG. 10 (the solid line), thereby increasing a radiator pressure PCI (a high pressure side pressure), and hence as compared with the case where the controller does not perform the correction (the broken line), the number of revolution Nc of the compressor 2 at the early stage of start also decreases and is inhibited from excessively increasing. Consequently, a pressure (a low pressure side pressure) of the outdoor heat exchanger 7 also increases and the frosting is hard to occur onto the outdoor heat exchanger 7, and hence the vehicle air conditioning device delays proceeding of the frosting onto the outdoor heat exchanger 7, thereby making it possible to eliminate or inhibit deterioration of a heating capability due to the frosting.

Figure 12:
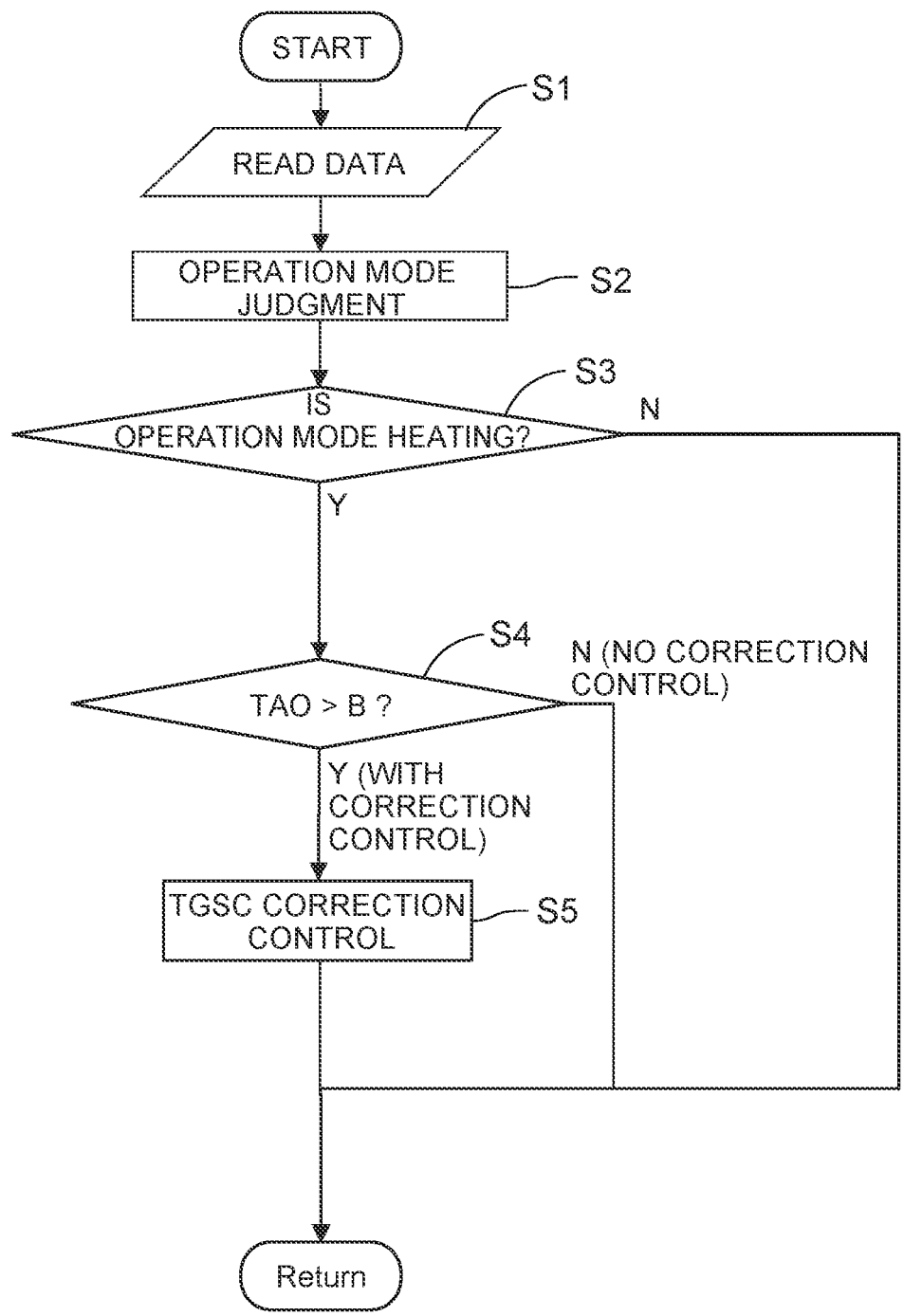
FIG. 12 is a flowchart showing another example of the control flowchart of the controller in the case of FIG. 10.

It is to be noted that FIG. 12 shows another example of a flowchart of the controller 32 concerning such frosting delay control. In this case, in step S4, the controller compares a target outlet temperature TAO with a predetermined value B. At an early stage of start, the temperature of the air of the vehicle interior is also low, the target outlet temperature TAO also heightens to be higher than the predetermined value B, and hence also by such comparison, it is possible to judge whether or not to execute correction control of a target subcool degree TGSC in step S5.

Figure 13:
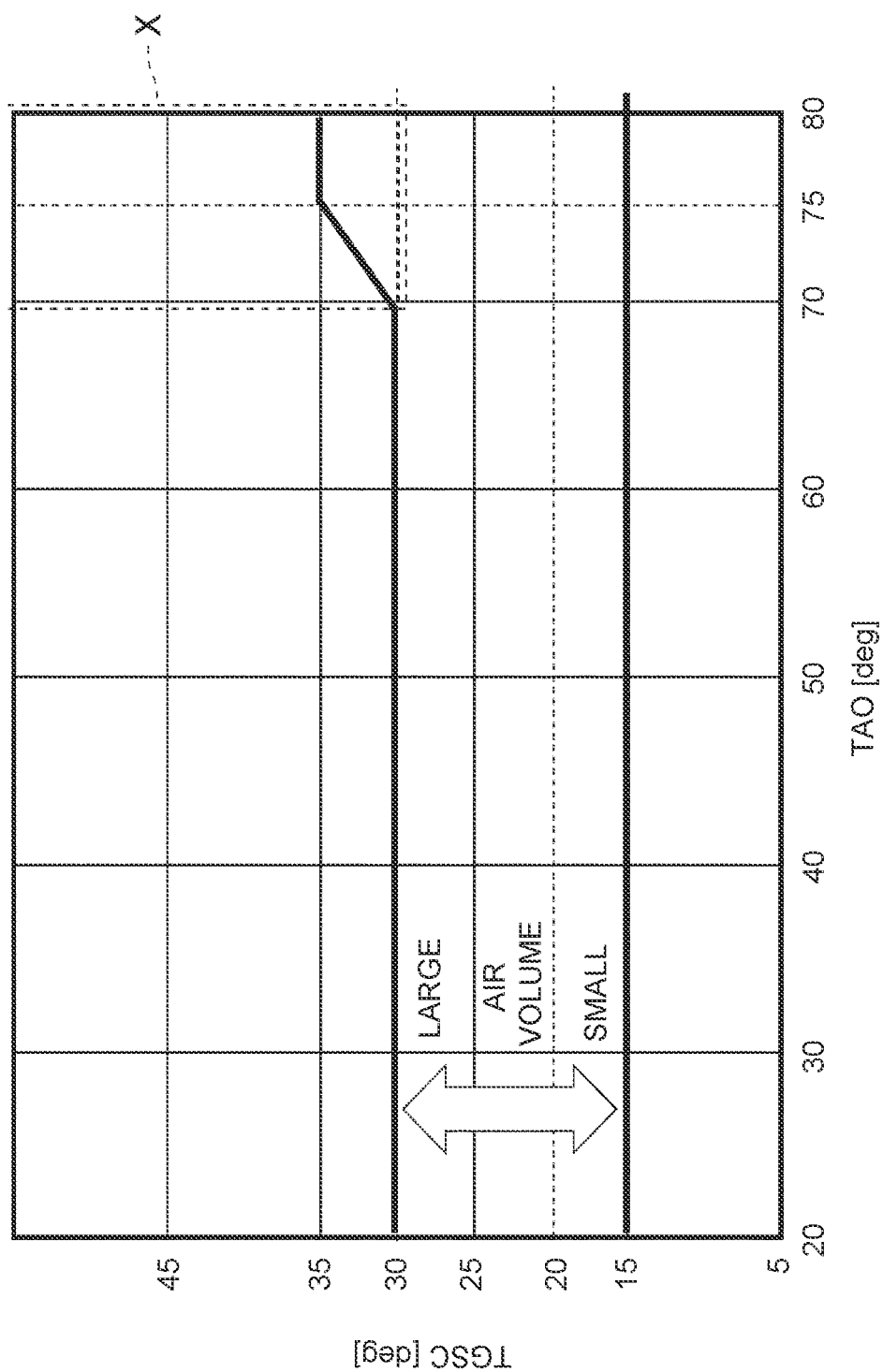
FIG. 13 is a diagram showing a setting example of TGSC by the controller in the case of FIG. 10.

FIG. 13 shows this behavior. In this drawing, a target radiator subcool degree calculation section 58 of the controller 32 determines the target subcool degree TGSC from the target outlet temperature TAO, and in this case, the section determines that TGSC heightens as an air volume of an air flow passage 3 is larger, but in a situation where the air volume is large, the controller 32 increases the target subcool degree TGSC in a region where the target outlet temperature TAO is high (a region where the temperature is higher than the predetermined value B (e.g., 80) shown by X in FIG. 13). In this way, the controller judges whether or not it is the early stage of start, in accordance with the target outlet temperature TAO, to correct the target subcool degree TGSC, and also in this case, it is possible to delay the proceeding of the frosting onto the outdoor heat exchanger 7.

Embodiment 7

(8-8) Example (No. 7) of Frosting Delay Control to Outdoor Heat Exchanger

Figure 14:
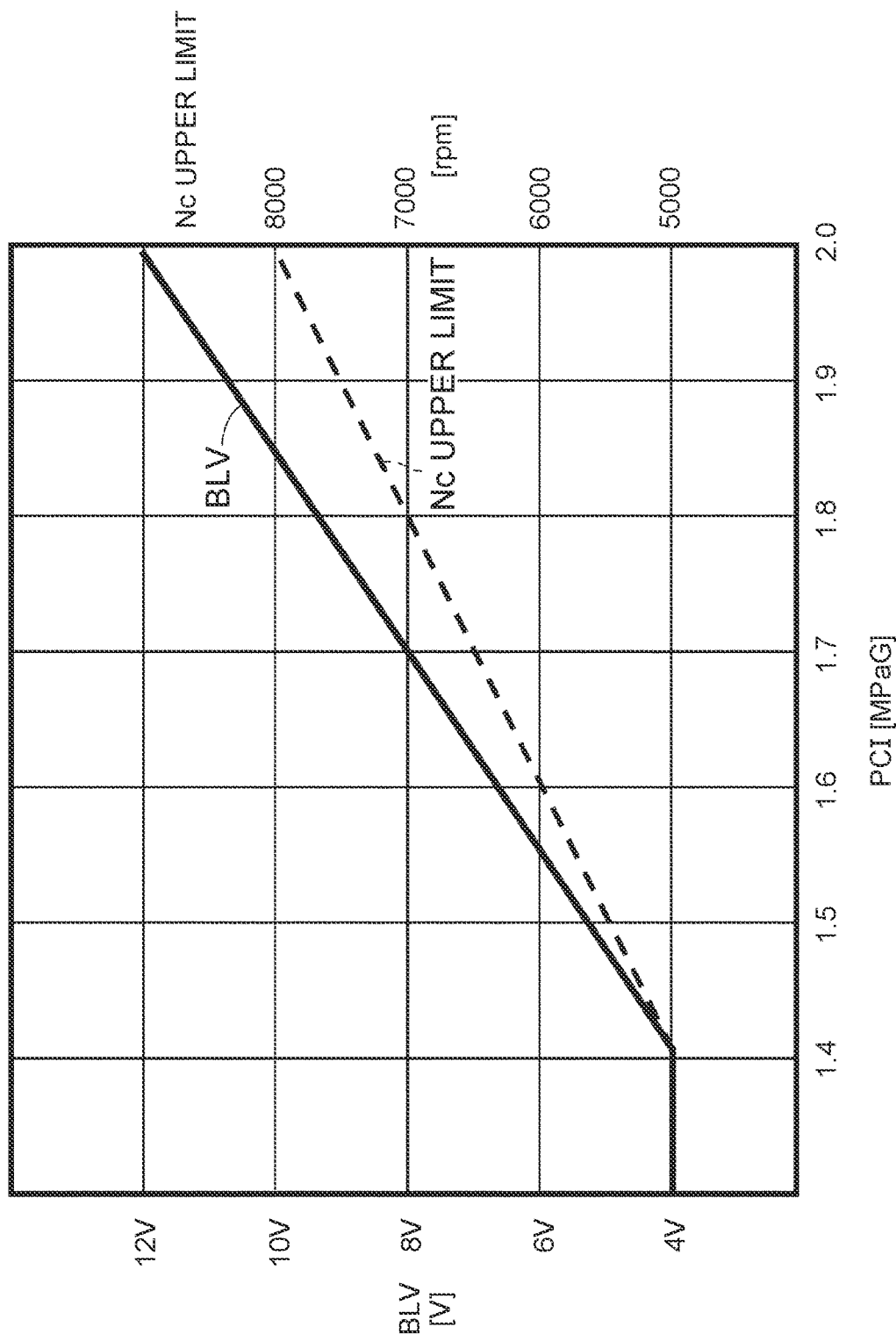
FIG. 14 is a diagram showing a relation between an indoor blower air volume and a compressor number of revolution to a radiator pressure PCI (a high pressure side pressure) to explain a further embodiment of the frosting delay control to the outdoor heat exchanger by the controller of FIG. 2 (Embodiment 7)

Next, FIG. 14 shows a further example of frosting delay control to an outdoor heat exchanger 7 by a controller 32. In this drawing, an Nc upper limit shown by a broken line is the above-mentioned upper limit of controlling of a number of revolution Nc of a compressor 2. BLV shown by a solid line is the above-mentioned blower voltage of an indoor blower 27, and indicates a volume of air to be supplied from the indoor blower 27 to an air flow passage 3.

In this case, on the basis of a radiator pressure PCI (a high pressure side pressure) detected by a radiator pressure sensor 47, the controller 32 maintains the blower voltage BLV of the indoor blower 27 at, e.g., 4 V and also maintains the upper limit of controlling of the number of revolution Nc of the compressor 2 at, e.g., 5000 rpm until the radiator pressure PCI increases to a predetermined value of 1.4 MPa in the embodiment. Further, as the radiator pressure PCI in excess of the predetermined value (1.4 MPa) increases to, e.g., 2.0 MPa, the controller 32 increases the blower voltage BLV of the indoor blower 27 with a predetermined inclination to, e.g., 12 V, and also similarly increases the upper limit of controlling of the number of revolution Nc of the compressor 2 to, e.g., 8000 rpm.

Thus, in this embodiment, the controller 32 executes control so that the controller does not increase the air volume (BLV) of the indoor blower 27, but maintains the air volume at 4 V, and also decreases and maintains the upper limit of controlling of the number of revolution Nc of the compressor 2 at a low value (5000 rpm) and does not increase the upper limit of controlling, until the radiator pressure PCI (the high pressure side pressure) increases to the predetermined value (1.4 MPa).

The controller does not increase the air volume of the indoor blower 27, and can therefore increase the radiator pressure PCI (the high pressure side pressure) earlier, whereby the controller also increases a pressure (a low pressure side pressure) of the outdoor heat exchanger 7 and also raises a temperature TXO thereof, thereby making it possible to delay proceeding of frosting. Furthermore, also by decreasing the upper limit of controlling of the number of revolution Nc of the compressor 2, it is possible to prevent excessive decrease of the pressure (the low pressure side pressure) of the outdoor heat exchanger 7, and hence a vehicle air conditioning device executes these operations together in a situation where the frosting occurs onto the outdoor heat exchanger 7, and thus delays the proceeding of the frosting onto the outdoor heat exchanger 7, thereby making it possible to eliminate or inhibit deterioration of a heating capability due to the frosting of the outdoor heat exchanger 7.

Embodiment 8

(8-9) Example (No. 8) of Frosting Delay Control to Outdoor Heat Exchanger

Figure 15:
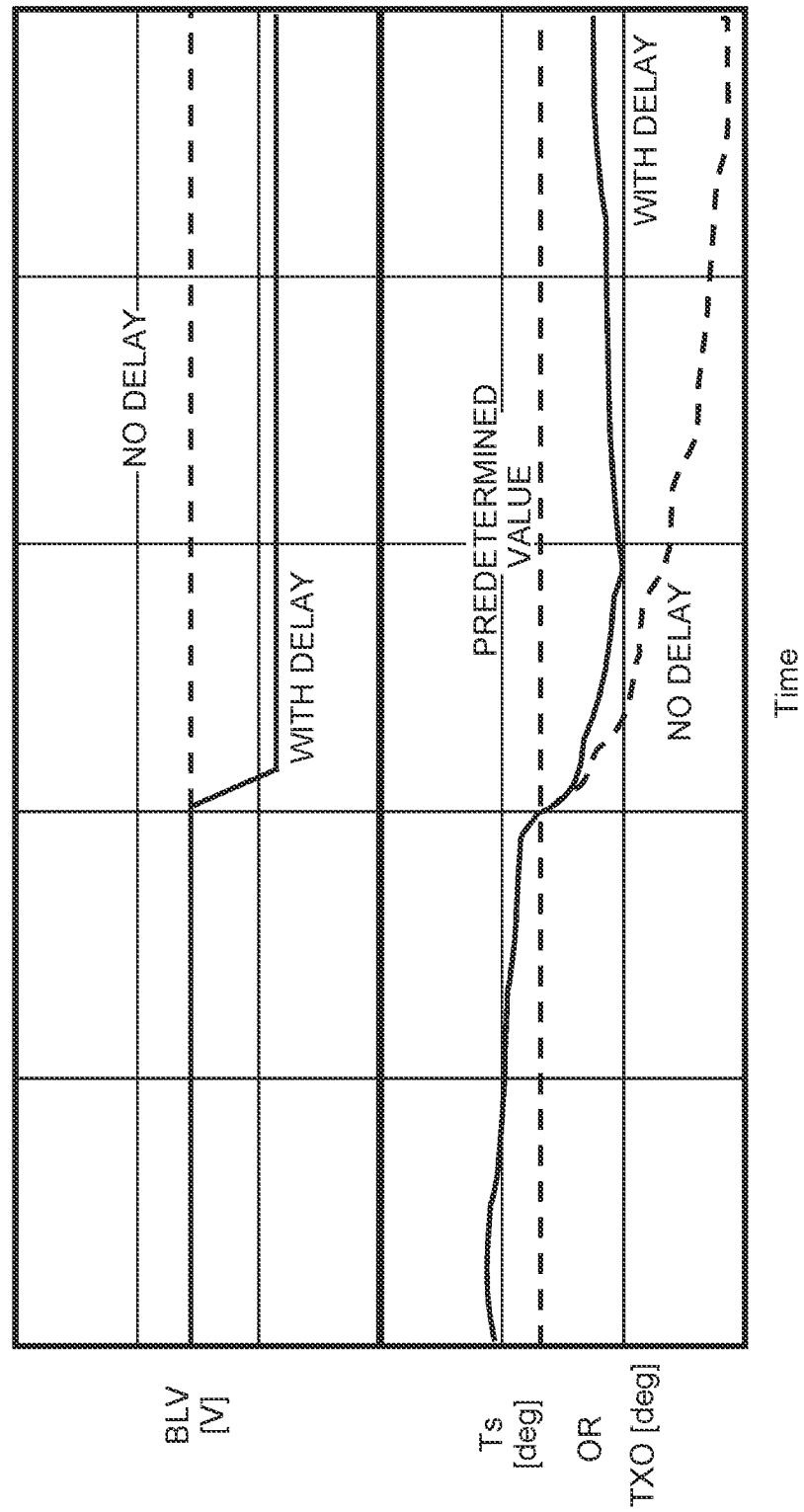
FIG. 15 is a timing chart showing changes of a compressor suction refrigerant temperature, or an outdoor heat exchanger refrigerant evaporation temperature TXO, and an indoor blower air volume of the vehicle air conditioning device to explain a further embodiment of the frosting delay control to the outdoor heat exchanger by the controller of FIG. 2 (Embodiment 8)

Next, FIG. 15 shows a further example of frosting delay control to an outdoor heat exchanger 7 by a controller 32. In this drawing, BLV shown in an upper stage is the above-mentioned blower voltage of an indoor blower 27, and indicates a volume of air to be supplied from the indoor blower 27 to an air flow passage 3. Furthermore, Ts shown in a lower stage is the above-mentioned suction refrigerant temperature to a compressor 2 which is detected by a suction temperature sensor 45, and TXO is the above-mentioned refrigerant evaporation temperature of the outdoor heat exchanger 7 which is detected by an outdoor heat exchanger temperature sensor 54.

In this case, the controller 32 decreases the blower voltage BLV of the indoor blower 27 as shown by a solid line in the drawing, in a case where the suction refrigerant temperature Ts detected by the suction temperature sensor 45 or the refrigerant evaporation temperature TXO of the outdoor heat exchanger 7 which is detected by the outdoor heat exchanger temperature sensor 54 lowers to a predetermined low value (the predetermined value) (with the frosting delay control). It is to be noted that a broken line shows a case where the controller does not decrease the blower voltage (no frosting delay control).

Here, when frosting starts onto the outdoor heat exchanger 7 in a heating mode, the suction refrigerant temperature Ts of the compressor 2 or the refrigerant evaporation temperature TXO of the outdoor heat exchanger 7 lowers. To eliminate such a problem, in this embodiment, the controller 32 decreases the blower voltage BLV of the indoor blower 27 to decrease the volume of the air to be supplied to the air flow passage 3 as described above, in a case where the suction refrigerant temperature Ts of the compressor 2 lowers to the predetermined value or the refrigerant evaporation temperature TXO of the outdoor heat exchanger 7 lowers to the predetermined value.

When the air volume of the indoor blower 27 decreases, a required heating capability decreases in the same manner as described above, a number of revolution Nc of the compressor 2 therefore also decreases, a flow rate of the refrigerant flowing into the outdoor heat exchanger 7 also decreases, and hence a quantity of heat to be absorbed in the outdoor heat exchanger 7 also decreases. Furthermore, the suction refrigerant temperature Ts that is the temperature of the refrigerant flowing out from the outdoor heat exchanger 7 or the refrigerant evaporation temperature TXO in the outdoor heat exchanger 7 also rises as shown by a solid line in the drawing (with the frosting delay control, and a broken line shows the case of no frosting delay control). Consequently, in such a situation where the frosting occurs onto the outdoor heat exchanger 7, a vehicle air conditioning device delays proceeding of the frosting onto the outdoor heat exchanger 7, thereby making it possible to eliminate or inhibit deterioration of the heating capability due to the frosting of the outdoor heat exchanger 7.

Embodiment 9

(8-10) Example (No. 9) of Frosting Delay Control to Outdoor Heat Exchanger

Figure 16:
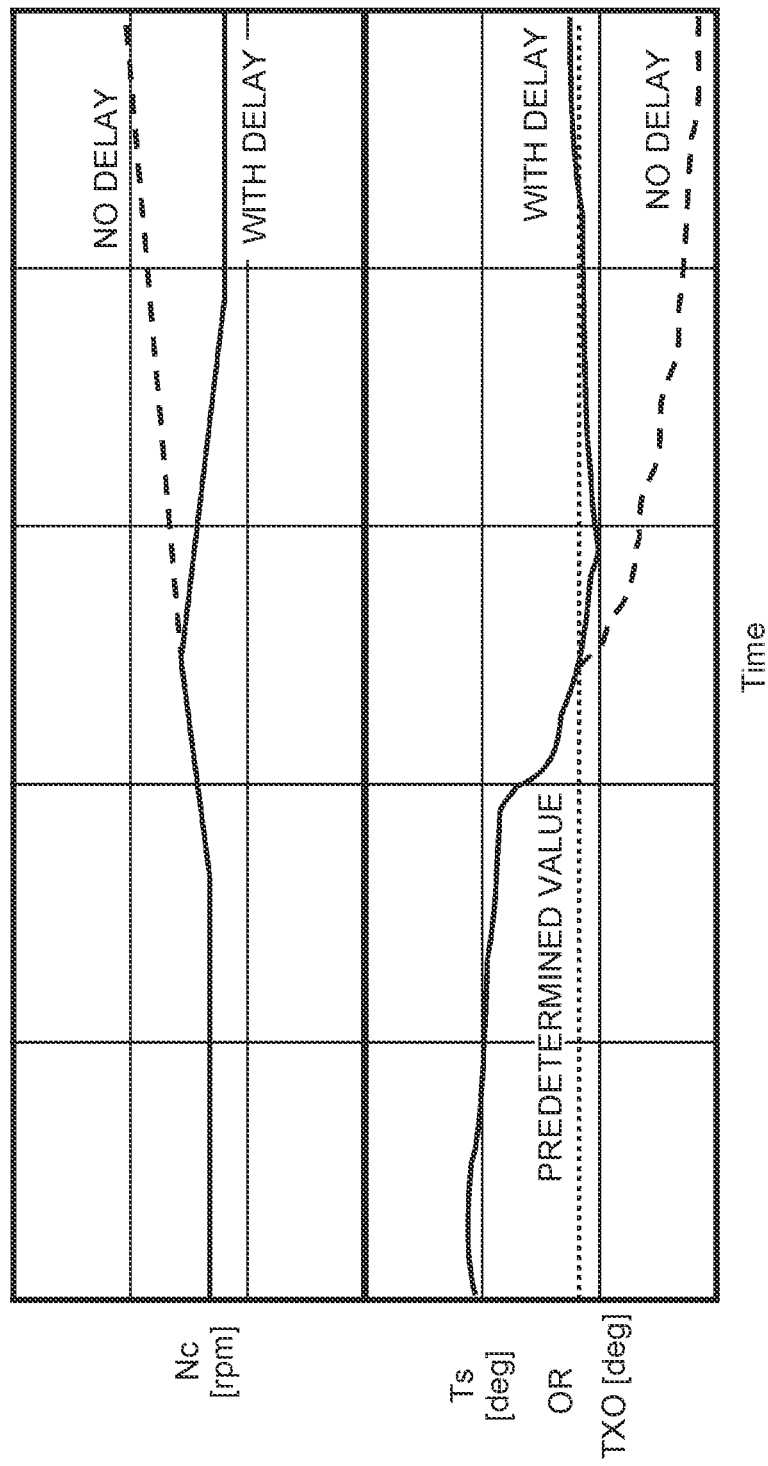
FIG. 16 is a timing chart showing changes of a compressor suction refrigerant temperature, or an outdoor heat exchanger refrigerant evaporation temperature TXO, and a compressor number of revolution of the vehicle air conditioning device to explain a further embodiment of the frosting delay control to the outdoor heat exchanger by the controller of FIG. 2 (Embodiment 9)

Next, FIG. 16 shows a further example of frosting delay control to an outdoor heat exchanger 7 by a controller 32. In this drawing, Nc shown in an upper stage is the above-mentioned number of revolution of a compressor 2. Furthermore, Ts shown in a lower stage is the above-mentioned suction refrigerant temperature to the compressor 2 which is detected by a suction temperature sensor 45, and TXO is the above-mentioned refrigerant evaporation temperature of the outdoor heat exchanger 7 which is detected by an outdoor heat exchanger temperature sensor 54.

In this case, a compressor revolution number calculation section 62 of the controller 32 controls the number of revolution Nc of the compressor 2 to maintain the suction refrigerant temperature Ts detected by the suction temperature sensor 45 or the refrigerant evaporation temperature TXO of the outdoor heat exchanger 7 which is detected by the outdoor heat exchanger temperature sensor 54 at a predetermined proper value (the predetermined value that is not excessively low). That is, for example, in a case where the suction refrigerant temperature Ts or the refrigerant evaporation temperature TXO lowers to the predetermined value or less, the controller 32 decreases the number of revolution Nc of the compressor 2. The number of revolution Nc decreases, whereby a flow rate of a refrigerant flowing into the outdoor heat exchanger 7 also decreases, and hence a quantity of heat to be absorbed in the outdoor heat exchanger 7 decreases.

Furthermore, the suction refrigerant temperature Ts that is the temperature of the refrigerant flowing out from the outdoor heat exchanger 7 or the refrigerant evaporation temperature TXO in the outdoor heat exchanger 7 also rises as shown by a solid line in the drawing (with the frosting delay control, and a broken line shows the case of no frosting delay control), and is maintained at the predetermined value. In this way, the controller adjusts the number of revolution Nc of the compressor 2 to maintain the suction refrigerant temperature Ts of the compressor 2 or the refrigerant evaporation temperature TXO of the outdoor heat exchanger 7 at the predetermined value, which prevents the disadvantage that the temperature lowers to easily cause frosting, thereby making it possible to eliminate or inhibit deterioration of a heating capability due to the frosting of the outdoor heat exchanger 7.

Embodiment 10

(8-11) Example (No. 10) of Frosting Delay Control to Outdoor Heat Exchanger

Figure 17:
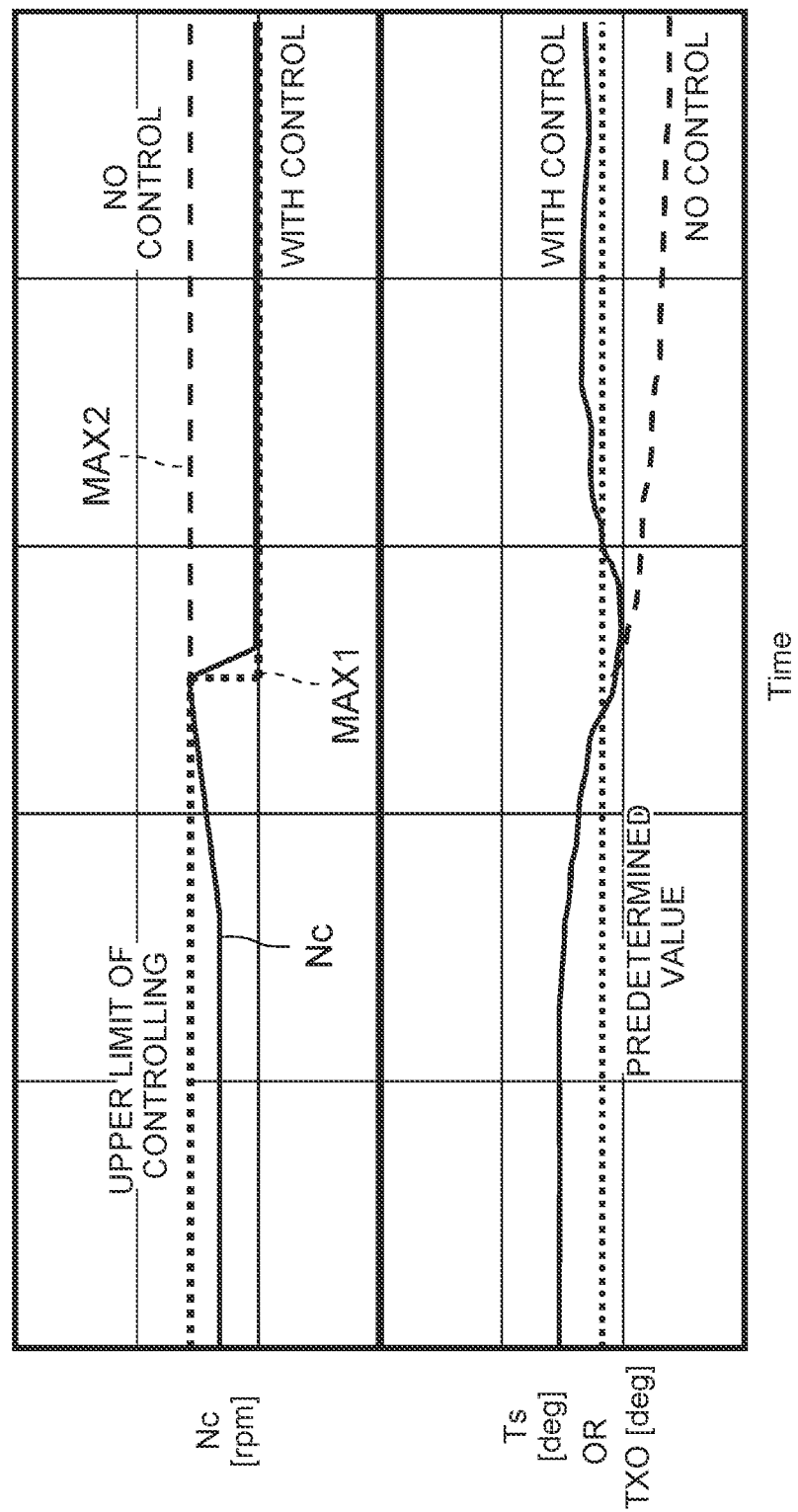
FIG. 17 is a timing chat showing changes of a compressor suction refrigerant temperature or an outdoor heat exchanger refrigerant evaporation temperature TXO and an upper limit of controlling of a compressor number of revolution of the vehicle air conditioning device to explain a further embodiment of the frosting delay control to the outdoor heat exchanger by the controller of FIG. 2 (Embodiment 10)

Next, FIG. 17 shows a further example of frosting delay control to an outdoor heat exchanger 7 by a controller 32. In this drawing, Nc shown by a solid line in an upper stage is the above-mentioned number of revolution of a compressor 2, and a broken line shows an upper limit of controlling of the number of revolution Nc of the compressor 2. Furthermore, Ts shown in a lower stage is the above-mentioned suction refrigerant temperature to the compressor 2 which is detected by a suction temperature sensor 45, and TXO is the above-mentioned refrigerant evaporation temperature of the outdoor heat exchanger 7 which is detected by an outdoor heat exchanger temperature sensor 54.

In this case, a compressor revolution number calculation section 62 of the controller 32 decreases the upper limit of controlling of the number of revolution Nc of the compressor 2 as shown by MAX1 in the drawing in a case where the suction refrigerant temperature Ts detected by the suction temperature sensor 45 or the refrigerant evaporation temperature TXO of the outdoor heat exchanger 7 which is detected by the outdoor heat exchanger temperature sensor 54 lowers to a predetermined low value (the predetermined value) (with the frosting delay control). It is to be noted that MAX2 shows a case where the controller does not decrease the upper limit of controlling (no frosting delay control).

Here, when frosting starts onto the outdoor heat exchanger 7 in a heating mode, the suction refrigerant temperature Ts of the compressor 2 or the refrigerant evaporation temperature TXO of the outdoor heat exchanger 7 lowers. To eliminate such a problem, in this embodiment, the controller 32 decreases the upper limit of controlling of the number of revolution Nc of the compressor 2 to inhibit increase of the number of revolution Nc of the compressor 2 as described above, in the case where the suction refrigerant temperature Ts of the compressor 2 lowers to the predetermined value or the case where the refrigerant evaporation temperature TXO of the outdoor heat exchanger 7 lowers to the predetermined value.

When the upper limit of controlling of the number of revolution Nc of the compressor 2 decreases, the number of revolution Nc of the compressor 2 is minimized to also decrease a quantity of heat to be absorbed in the outdoor heat exchanger 7, and hence in the same manner as described above, in a situation where the frosting occurs onto the outdoor heat exchanger 7, a vehicle air conditioning device delays proceeding of the frosting onto the outdoor heat exchanger 7, thereby making it possible to eliminate or inhibit deterioration of a heating capability due to the frosting of the outdoor heat exchanger 7.

Embodiment 11

(8-12) Example (No. 11) of Frosting Delay Control to Outdoor Heat Exchanger

Figure 18:
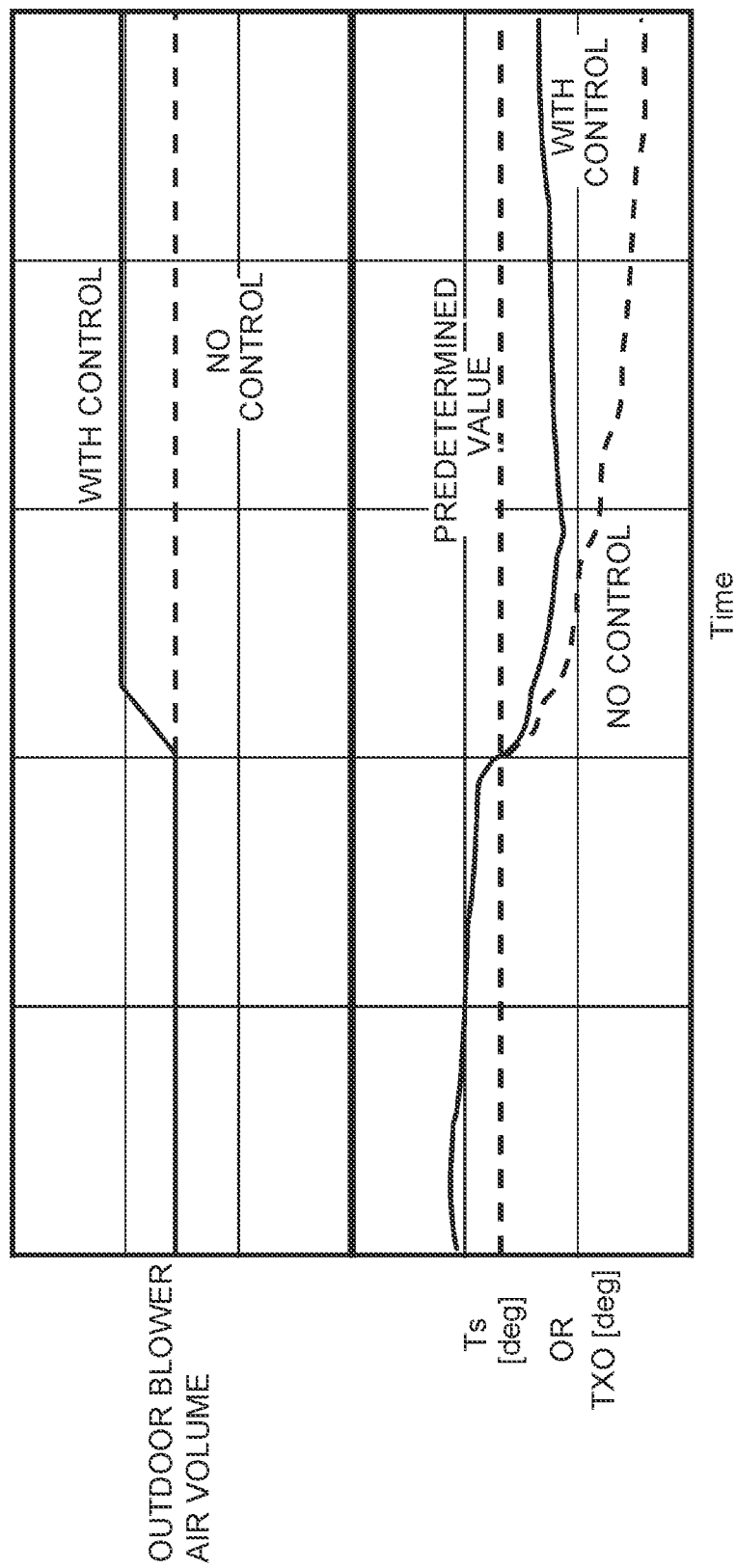
FIG. 18 is a timing chart showing changes of a compressor refrigerant suction temperature or an outdoor heat exchanger refrigerant evaporation temperature TXO and an outdoor blower air volume (an operation ratio) of a vehicle air conditioning device to explain a further embodiment of the frosting delay control to the outdoor heat exchanger by the controller of FIG. 2 (Embodiment 11)

Next, FIG. 18 shows a further example of frosting delay control to an outdoor heat exchanger 7 by a controller 32. In this drawing, an upper stage shows an air volume (an operation ratio) of an outdoor blower 15. Furthermore, Ts shown in a lower stage is the above-mentioned suction refrigerant temperature to a compressor 2 which is detected by a suction temperature sensor 45, and TXO is the above-mentioned refrigerant evaporation temperature of the outdoor heat exchanger 7 which is detected by an outdoor heat exchanger temperature sensor 54.

In this case, the controller 32 increases the air volume of the outdoor blower 15 as shown by a solid line in the drawing in a case where the suction refrigerant temperature Ts detected by the suction temperature sensor 45 or the refrigerant evaporation temperature TXO of the outdoor heat exchanger 7 which is detected by the outdoor heat exchanger temperature sensor 54 lowers to a predetermined low value (the predetermined value) (with the frosting delay control). It is to be noted that a broken line shows a case where the controller does not increase the air volume (no frosting delay control).

When the air volume of the outdoor blower 15 increases, an operation pressure of the outdoor heat exchanger 7 also increases, and hence frosting is hard to occur onto the outdoor heat exchanger 7. Furthermore, the suction refrigerant temperature Ts that is the temperature of the refrigerant flowing out from the outdoor heat exchanger 7 or the refrigerant evaporation temperature TXO in the outdoor heat exchanger 7 rises as shown by a solid line in the drawing (with the frosting delay control, and the broken line shows the case of no frosting delay control). Consequently, in the same manner as described above, in a situation where the frosting occurs onto the outdoor heat exchanger 7, a vehicle air conditioning device delays proceeding of the frosting onto the outdoor heat exchanger 7, thereby making it possible to eliminate or inhibit deterioration of a heating capability due to the frosting of the outdoor heat exchanger 7.

Embodiment 12

(8-13) Example (No. 12) of Frosting Delay Control to Outdoor Heat Exchanger

Figure 19:
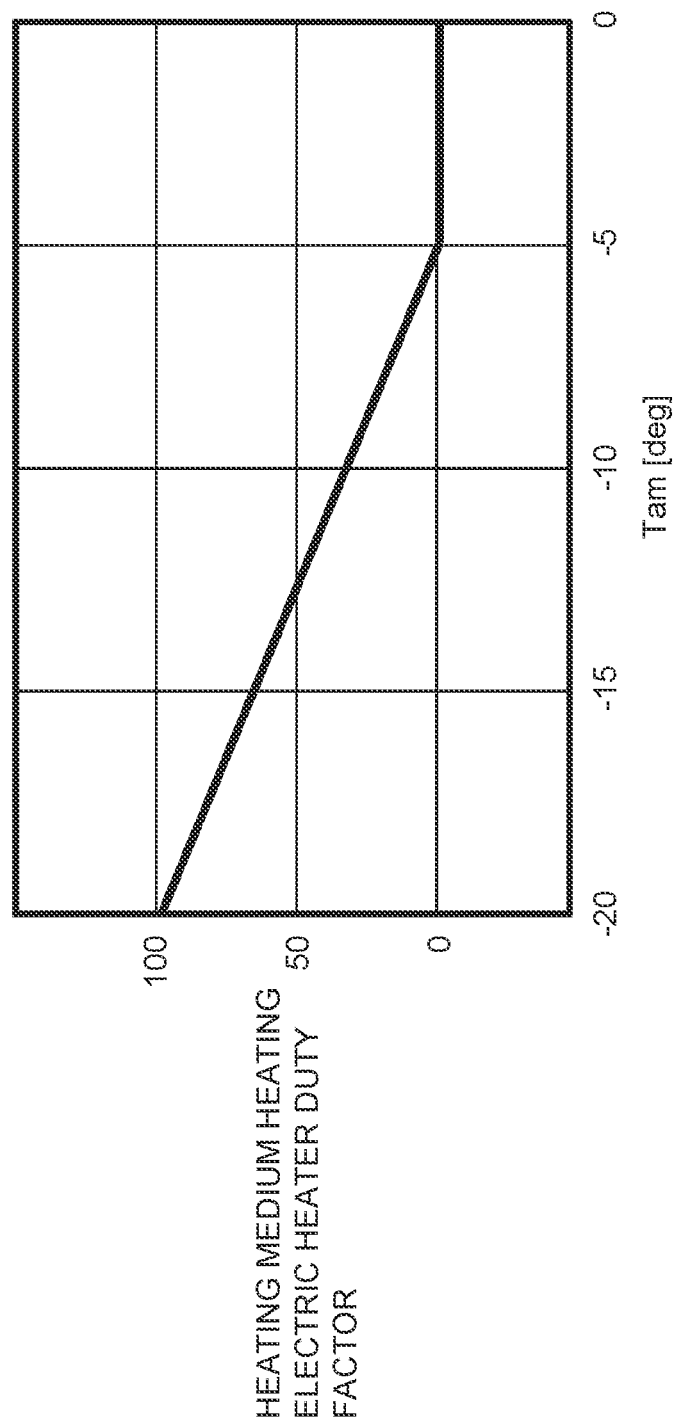
FIG. 19 is a diagram showing a relation between an outdoor air temperature and an operation of a heating medium circulating circuit to explain a further embodiment of the frosting delay control to the outdoor heat exchanger by the controller of FIG. 2 (Embodiment 12)

Next, FIG. 19 shows a still further example of frosting delay control to an outdoor heat exchanger 7 by a controller 32. In this case, at an early stage of start of a vehicle air conditioning device 1 or at an early stage of start of a heating mode, the controller 32 controls a duty factor of a heating medium heating electric heater 35 of a heating medium circulating circuit 23 in accordance with an outdoor air temperature Tam detected by an outdoor air temperature sensor 33.

That is, in this embodiment, the controller 32 adjusts the duty factor of the heating medium heating electric heater 35 into 0, for example, in a case where the outdoor air temperature Tam is 0° C. or more. Further, as the outdoor air temperature Tam lowers below 0° C. to reach, e.g., −20° C., the controller increases the duty factor of the heating medium heating electric heater 35 up to 100% with a predetermined inclination.

That is, at the early stage of start, in a situation where the outdoor air temperature Tam is low, the controller 32 operates the heating medium circulating circuit 23, and generates heat by the heating medium heating electric heater 35 to heat air in an air flow passage 3 by a heating medium-air heat exchanger 40, and as the outdoor air temperature Tam is lower, the controller increases a quantity of heat to be generated by the heating medium heating electric heater 35 to increase a heating amount by the heating medium-air heat exchanger 40.

At the early stage of the vehicle air conditioning device 1 or at the early stage of start of the heating mode in the situation where the outdoor air temperature Tam is low, a number of revolution Nc of a compressor 2 is easy to heighten, and frosting easily occurs onto the outdoor heat exchanger 7, but in this situation, the controller operates the heating medium circulating circuit 23 at such an early stage of start, thereby making it possible to decrease a load to be applied to a refrigerant circuit R and to decrease the number of revolution Nc of the compressor 2. Consequently, a pressure (a low pressure side pressure) of the outdoor heat exchanger 7 also increases, a temperature thereof also rises, and the frosting is hard to occur onto the outdoor heat exchanger 7, and hence the vehicle air conditioning device delays proceeding of the frosting onto the outdoor heat exchanger 7, and it is possible to eliminate or inhibit deterioration of a heating capability due to the frosting.

Embodiment 13

Figure 20:
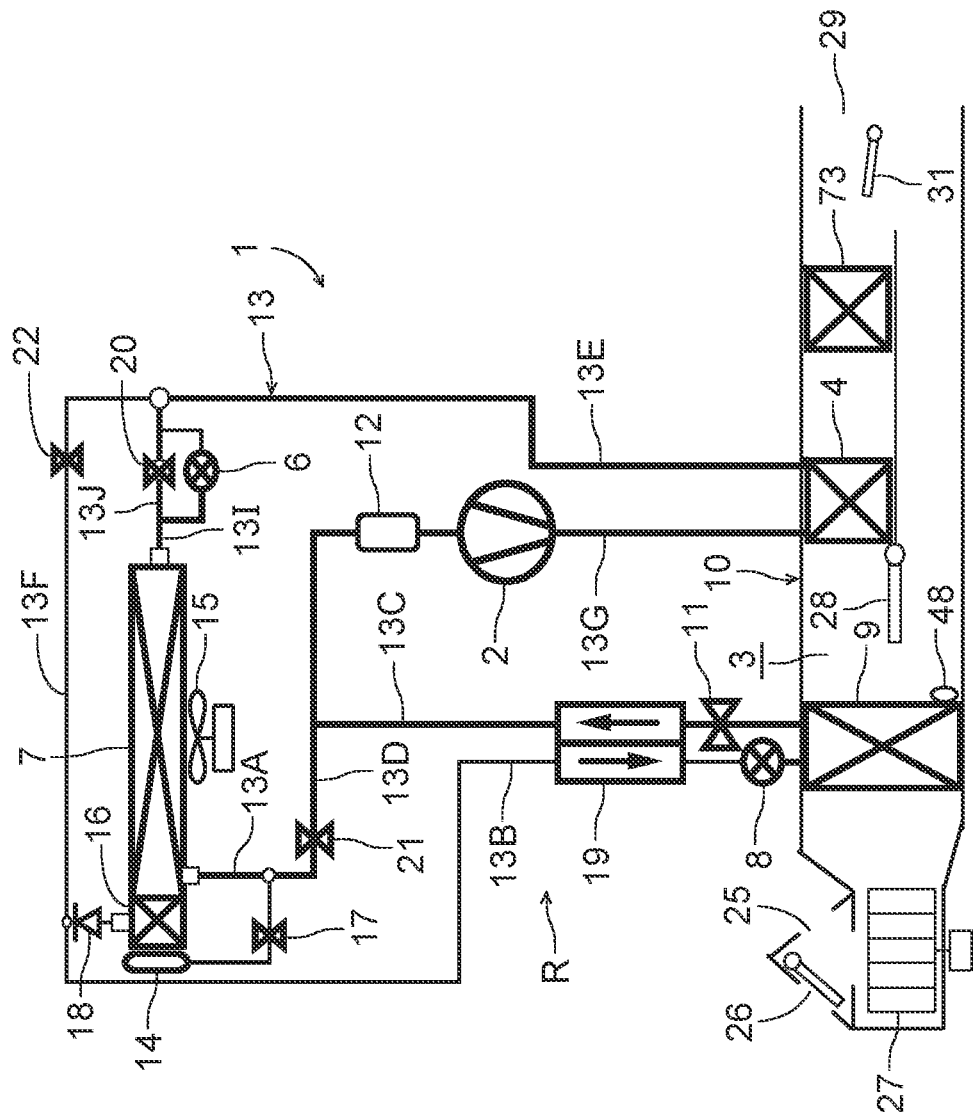
FIG. 20 is a constitutional view of another embodiment of the vehicle air conditioning device to which the present invention is applied (Embodiment 13)

It is to be noted that in the above respective embodiments, a heating medium circulating circuit 23 has been employed as auxiliary heating means, but a usual electric heater (e.g., a PTC heater) 73 may constitute the auxiliary heating means. FIG. 20 shows a constitutional example corresponding to FIG. 1 of this case. In FIG. 20, the heating medium circulating circuit 23 of FIG. 1 is replaced with the electric heater 73 of this case.

The other constitution and control are basically similar, and a controller 32 controls energization of the electric heater 73 in place of a circulating pump 30 and a heating medium heating electric heater 35 of the heating medium circulating circuit 23 to complement a heating capability of a radiator 4 by heat generation in the same manner as described above, and hence detailed description is omitted. In this way, air to be supplied to a vehicle interior may be heated with the electric heater 73, and such a constitution has the advantage that the constitution is simplified as compared with the case of using the heating medium circulating circuit 23.

Embodiment 14

Figure 21:
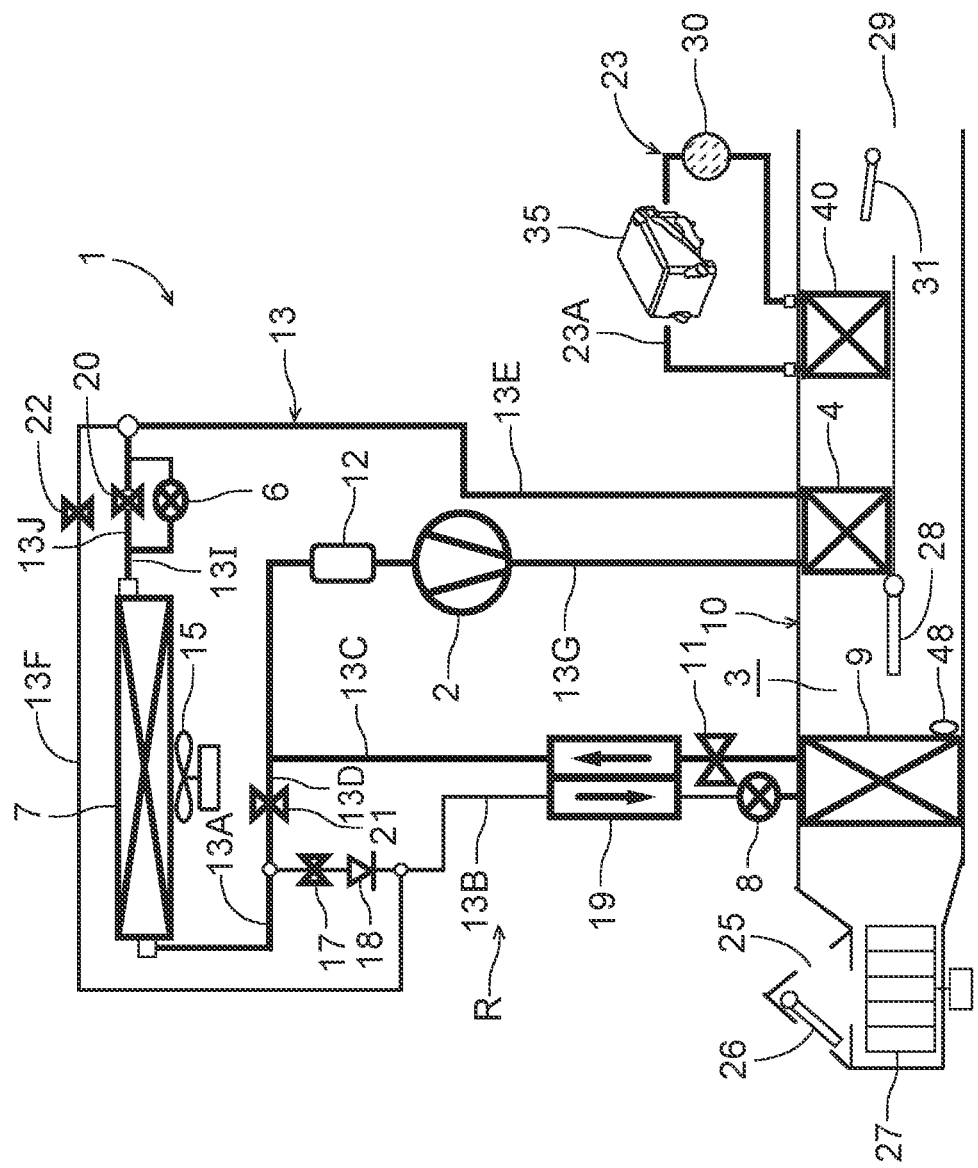
FIG. 21 is a constitutional view of still another embodiment of the vehicle air conditioning device to which the present invention is applied (Embodiment 14)

Next, FIG. 21 shows still another constitutional view of the vehicle air conditioning device 1 of the present invention. In this embodiment, an outdoor heat exchanger 7 does not include a receiver drier portion 14 and a subcooling portion 16, and a refrigerant pipe 13A extending out from the outdoor heat exchanger 7 is connected to a refrigerant pipe 13B via a solenoid valve 17 and a check valve 18. Furthermore, a refrigerant pipe 13D branching from the refrigerant pipe 13A is connected to a refrigerant pipe 13C on a downstream side of an internal heat exchanger 19 similarly via a solenoid valve 21.

The other constitution is similar to the example of FIG. 1. In this way, the present invention is also effective in the vehicle air conditioning device 1 of a refrigerant circuit R employing the outdoor heat exchanger 7 which does not have the receiver drier portion 14 and the subcooling portion 16.

Embodiment 15

Figure 22:
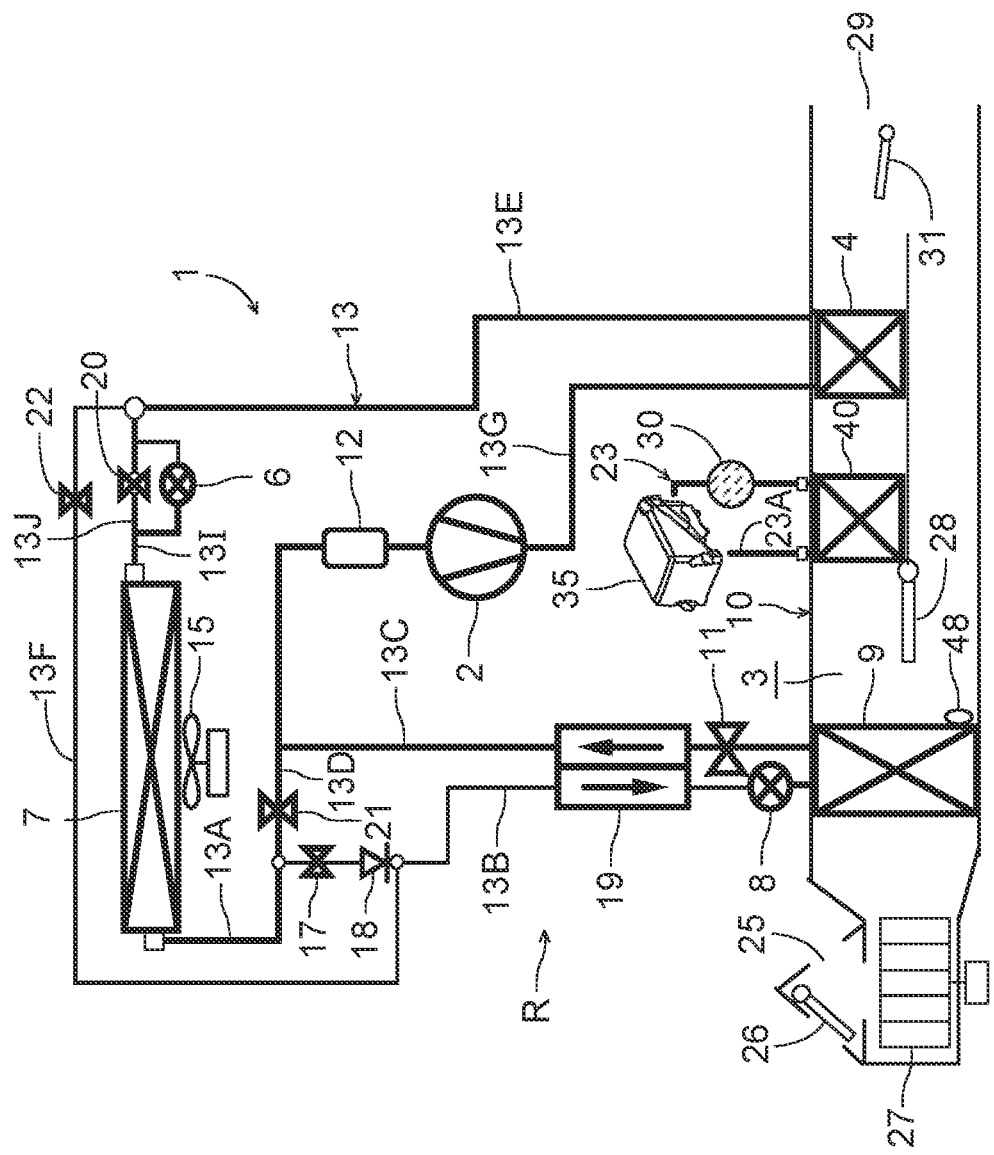
FIG. 22 is a constitutional view of a further embodiment of the vehicle air conditioning device to which the present invention is applied (Embodiment 15)

Next, FIG. 22 shows a further constitutional view of the vehicle air conditioning device 1 of the present invention. It is to be noted that a refrigerant circuit R of this embodiment is similar to FIG. 21. However, in this case, a heating medium-air heat exchanger 40 of a heating medium circulating circuit 23 is disposed on an upstream side of a radiator 4 and on a downstream side of an air mix damper 28 to a flow of air of an air flow passage 3. The other constitution is similar to FIG. 21.

In this case, the heating medium-air heat exchanger 40 is positioned on the upstream side of the radiator 4 in the air flow passage 3, and hence during an operation of the heating medium circulating circuit 23, air is heated with the heating medium-air heat exchanger 40 and then flows into the radiator 4. In this way, the present invention is also effective in the vehicle air conditioning device 1 in which the heating medium-air heat exchanger 40 is disposed on the upstream side of the radiator 4, and especially in this case, there does not occur the problem caused by the fact that a temperature of a heating medium in the heating medium circulating circuit 23 is low. Consequently, coordinated heating with the radiator 4 becomes easy, and a so-called preliminary operation of beforehand heating the heating medium is not required, but the air passed through the heating medium-air heat exchanger 40 flows into the radiator 4, and hence it is presumed that a temperature difference from the radiator 4 decreases and a heat exchange efficiency deteriorates.

On the other hand, in a case where the heating medium-air heat exchanger 40 is disposed on the downstream side of the radiator 4 to the flow of the air of the air flow passage 3 as in FIG. 1 and FIG. 21, as compared with a case where the heating medium-air heat exchanger 40 is disposed on the upstream side as in FIG. 22, the air heated in the heating medium-air heat exchanger 40 does not flow into the radiator 4, and a difference between the temperature of the radiator 4 and the temperature of the air is acquired, thereby making it possible to prevent the deterioration of the heat exchange efficiency in the radiator 4.

Embodiment 16

Figure 23:
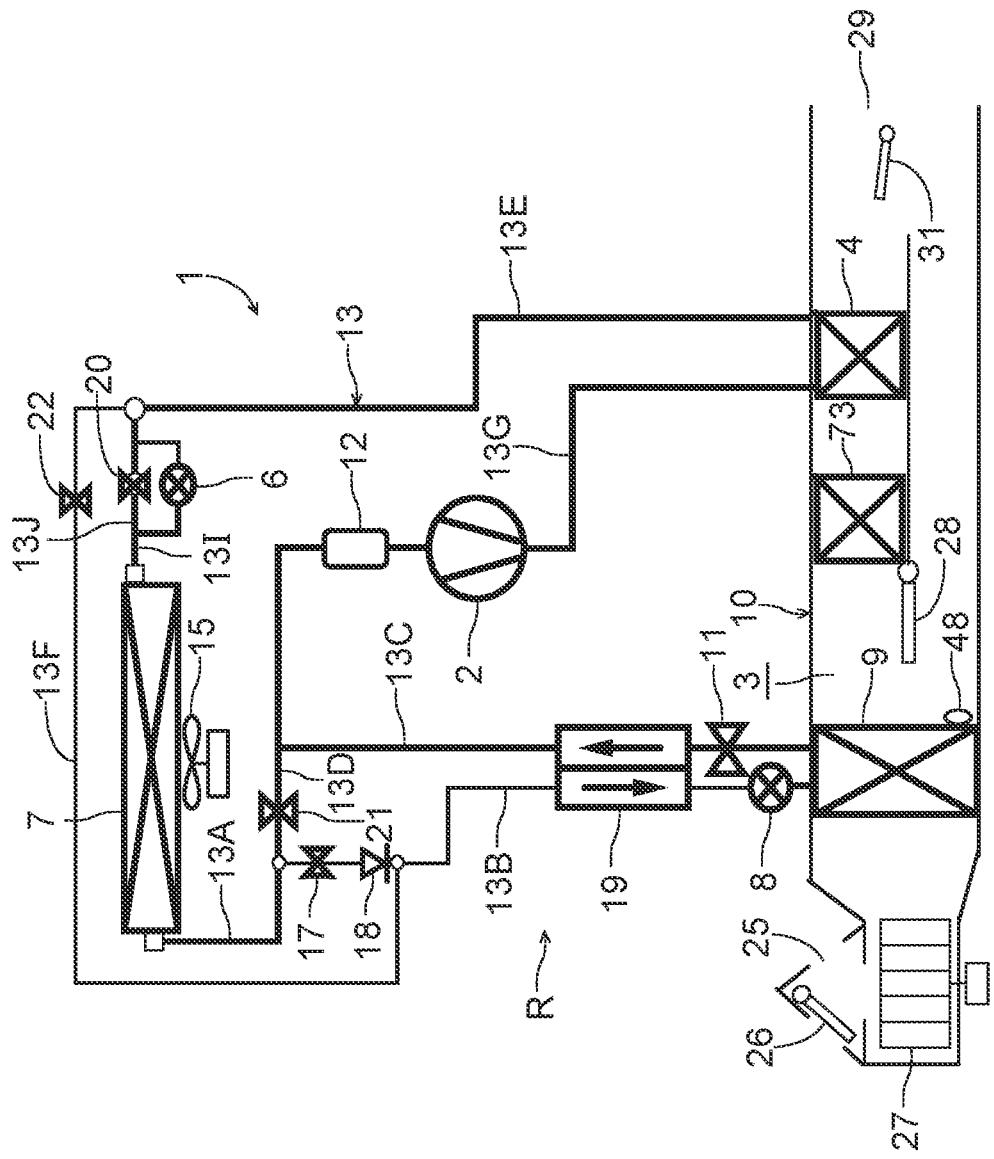
FIG. 23 is a constitutional view of a further embodiment of the vehicle air conditioning device to which the present invention is applied (Embodiment 16)

It is to be noted that the heating medium circulating circuit 23 of the above embodiment (FIG. 22) may similarly be replaced with a usual electric heater (a PTC heater) 73 to constitute auxiliary heating means. FIG. 23 shows a constitutional example corresponding to FIG. 22 of this case. In FIG. 23, the heating medium circulating circuit 23 of FIG. 22 is replaced with the electric heater 73 of this case.

The other constitution and control are basically similar, and a controller 32 controls energization of the electric heater 73 in place of a circulating pump 30 and a heating medium heating electric heater 35 of the heating medium circulating circuit 23 to complement a heating capability of a radiator 4 by heat generation in the same manner as described above, and hence detailed description is omitted. In this way, air to be supplied to a vehicle interior may be heated with the electric heater 73, and such a constitution has the advantage that the constitution is simplified as compared with the case of using the heating medium circulating circuit 23.

Embodiment 17

Figure 24:
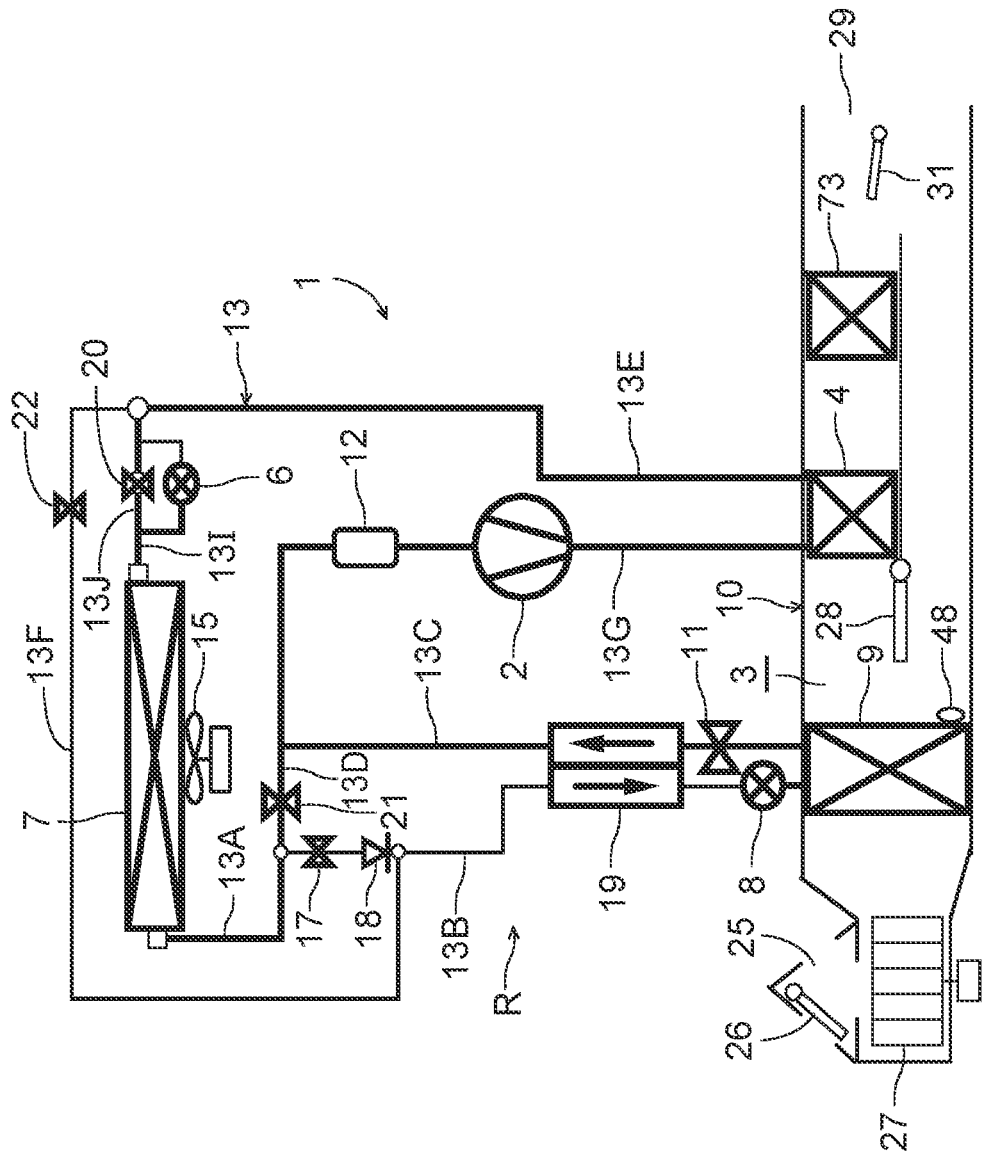
FIG. 24 is a constitutional view of a further embodiment of the vehicle air conditioning device to which the present invention is applied (Embodiment 17)

Furthermore, the heating medium circulating circuit 23 of the above embodiment (FIG. 21) may similarly be replaced with a usual electric heater (a PTC heater) 73 to constitute auxiliary heating means. FIG. 24 shows a constitutional example corresponding to FIG. 21 of this case. In FIG. 24, the heating medium circulating circuit 23 of FIG. 21 is replaced with the electric heater 73 of this case.

The other constitution and control are basically similar, and a controller 32 controls energization of the electric heater 73 in place of a circulating pump 30 and a heating medium heating electric heater 35 of the heating medium circulating circuit 23 to complement a heating capability of a radiator 4 by heat generation in the same manner as described above, and hence detailed description is omitted. In this way, air to be supplied to a vehicle interior may be heated with the electric heater 73, and such a constitution has the advantage that the constitution is simplified as compared with the case of using the heating medium circulating circuit 23.

Embodiment 18

Figure 25:
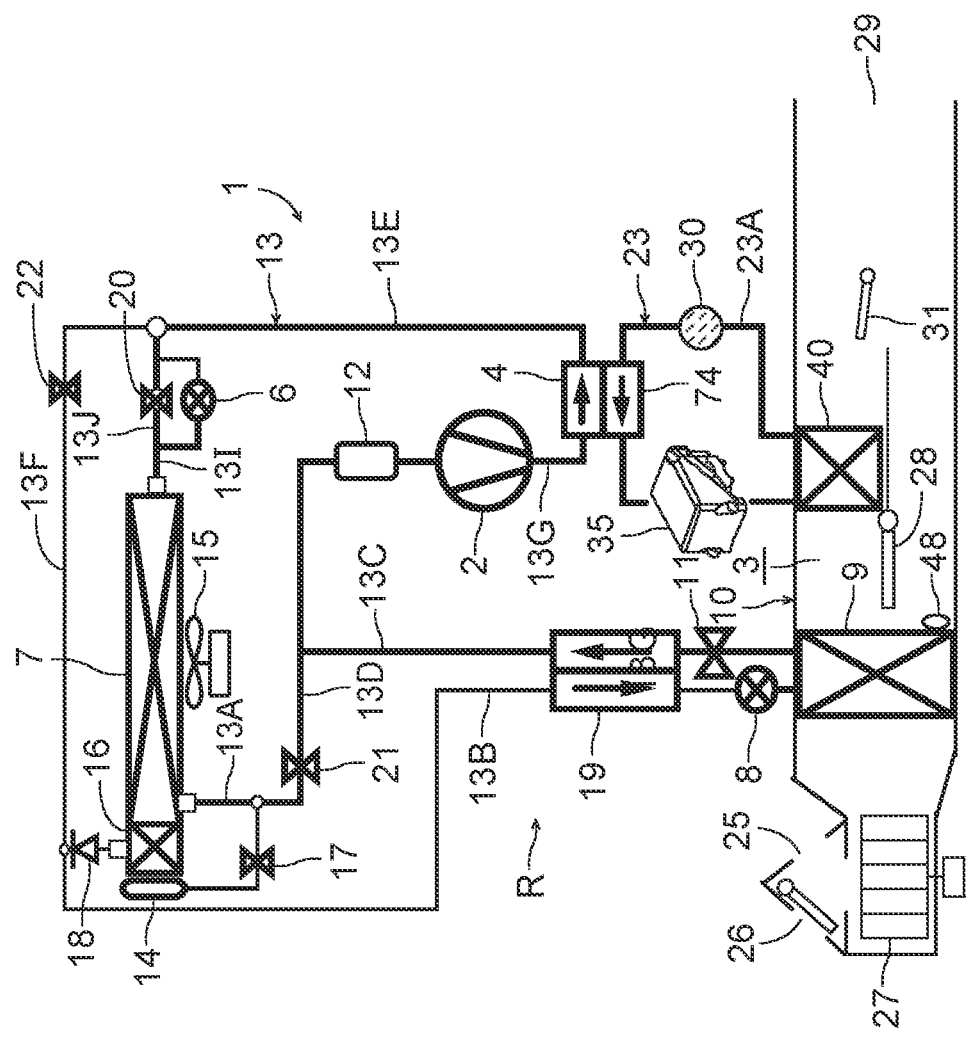
FIG. 25 is a constitutional view of a still further embodiment of the vehicle air conditioning device to which the present invention is applied (Embodiment 18)

Next, FIG. 25 shows a still further constitutional view of a vehicle air conditioning device 1 of the present invention. A refrigerant circuit R and a pipe constitution of a heating medium circulating circuit 23 of this embodiment are basically similar to the case of FIG. 1, but a radiator 4 is not disposed in an air flow passage 3, and is disposed outside the air flow passage. Instead, in the radiator 4, a heating medium-refrigerant heat exchanger 74 of this case is disposed in a heat exchange relation.

The heating medium-refrigerant heat exchanger 74 is connected to a heating medium pipe 23A between a circulating pump 30 and a heating medium heating electric heater 35 of the heating medium circulating circuit 23, and a heating medium-air heat exchanger 40 of the heating medium circulating circuit 23 is disposed in the air flow passage 3. According to such a constitution, a heating medium discharged from the circulating pump 30 performs heat exchange with a refrigerant flowing through the radiator 4, is heated by the refrigerant, is next heated with the heating medium heating electric heater 35 (in a case where the heater is energized to generate heat), and then radiates heat in the heating medium-air heat exchanger 40, thereby heating air to be supplied from the air flow passage 3 to a vehicle interior.

Also in the vehicle air conditioning device 1 of such a constitution, in a case where a heating capability of the radiator 4 runs short, the heating medium heating electric heater 35 is energized to heat the heating medium flowing in the heating medium pipe 23A, thereby enabling auxiliary heating, and as compared with a case where an electric heater is disposed in the air flow passage 3 as described above, it is possible to achieve electrically safer vehicle interior heating.

It is to be noted that in the above respective embodiments, the present invention is applied to the vehicle air conditioning device 1 which changes and executes the respective operation modes of the heating mode, the dehumidifying and heating mode, the dehumidifying and cooling mode and the cooling mode, but the present invention is not limited to these embodiments, and is also effective for a vehicle air conditioning device which only performs the heating mode.

Furthermore, the constitution and respective numeric values of the refrigerant circuit R described in the above respective embodiments are not limited to the embodiments, and are changeable without departing from the gist of the present invention.

DESCRIPTION OF REFERENCE NUMERALS 1 vehicle air conditioning device
2 compressor
3 air flow passage
4 radiator
6 outdoor expansion valve
7 outdoor heat exchanger
8 indoor expansion valve
9 heat absorber
11 evaporation capability control valve
15 outdoor blower
17, 20, 21 and 22 solenoid valve
23 heating medium circulating circuit (auxiliary heating means)
26 suction changing damper
27 indoor blower
28 air mix damper
32 controller (control means)
35 heating medium heating electric heater
40 heating medium-air heat exchanger
73 electric heater
R refrigerant circuit

The invention claimed is:

1. A vehicle air conditioning device comprising:
a compressor which compresses a refrigerant;
an air flow passage through which air to be supplied to a vehicle interior flows;
a radiator which lets the refrigerant radiate heat to heat the air to be supplied from the air flow passage to the vehicle interior;
a heat absorber which lets the refrigerant absorb heat to cool the air to be supplied from the air flow passage to the vehicle interior;
an outdoor heat exchanger disposed outside the vehicle interior to let the refrigerant absorb heat; and
control means,
the vehicle air conditioning device executing at least a heating mode in which the control means lets the refrigerant discharged from the compressor radiate heat in the radiator, decompresses the refrigerant by which heat has been radiated, and then lets the refrigerant absorb heat in the outdoor heat exchanger,
wherein the control means corrects a target subcool degree TGSC that is a target value of a subcool degree of the refrigerant in the radiator in an increasing direction at an early stage of start.

* * * * *